United States Patent
Flood et al.

(10) Patent No.: US 11,970,290 B2
(45) Date of Patent: Apr. 30, 2024

(54) SYSTEMS, DEVICES, AND METHODS FOR USE WITH AEROSPACE PARTS

(71) Applicant: Orizon Aerostructures, LLC, Kansas City, MO (US)

(72) Inventors: Mitch Flood, Girard, KS (US); Tyler Barnhart, Chanute, KS (US); Richard Paul Newell, Kansas City, MO (US)

(73) Assignee: ORIZON AEROSTRUCTURES, LLC, Kansas City, MO (US)

( * ) Notice: Subject to any disclaimer, the term of this patent is extended or adjusted under 35 U.S.C. 154(b) by 267 days.

(21) Appl. No.: 17/291,433

(22) PCT Filed: Nov. 5, 2019

(86) PCT No.: PCT/US2019/059814
§ 371 (c)(1),
(2) Date: May 5, 2021

(87) PCT Pub. No.: WO2020/097042
PCT Pub. Date: May 14, 2020

(65) Prior Publication Data
US 2022/0002002 A1     Jan. 6, 2022

Related U.S. Application Data

(60) Provisional application No. 62/756,940, filed on Nov. 7, 2018.

(51) Int. Cl.
*B64F 5/10*     (2017.01)
*B05B 12/20*    (2018.01)
(Continued)

(52) U.S. Cl.
CPC ............... *B64F 5/10* (2017.01); *B05B 12/20* (2018.02); *B05C 17/06* (2013.01); *B05D 1/32* (2013.01)

(58) Field of Classification Search
CPC ........... B64F 5/10; B05B 12/10; B05C 17/06; B05D 1/32
(Continued)

(56) References Cited

U.S. PATENT DOCUMENTS 3,243,313 A   3/1966  Aves
4,883,359 A   11/1989 Ina et al.
(Continued)

FOREIGN PATENT DOCUMENTS

CN   106362303 B   5/2018
EP   1762303 A1    3/2007
(Continued)

OTHER PUBLICATIONS

International Search Report and Written Opinion dated Feb. 28, 2021 in International Application PCT/US19/59814 filed Nov. 5, 2019 (10 pages).
(Continued)

*Primary Examiner* — Brian K Talbot
(74) *Attorney, Agent, or Firm* — Dentons US LLP

(57) ABSTRACT

This disclosure discloses a method comprising: positioning a stencil having an opening onto an aerospace part such that the aerospace part is accessible through the opening; positioning a masking medium onto the aerospace part through the opening; removing the stencil from the aerospace part such that the masking medium remains on the aerospace part and treating the aerospace part with the masking medium thereon.

25 Claims, 22 Drawing Sheets

(51) Int. Cl.
*B05C 17/06* (2006.01)
*B05D 1/32* (2006.01)

(58) Field of Classification Search
USPC .......................................................... 427/282
See application file for complete search history.

(56) References Cited

U.S. PATENT DOCUMENTS

| | | | | |
|---|---|---|---|---|
| 5,436,027 | A * | 7/1995 | Offer ...................... | B44C 1/228 |
| | | | | 427/555 |
| 5,560,102 | A | 10/1996 | Micale et al. | |
| 5,998,755 | A | 12/1999 | Zajchowski | |
| 6,109,873 | A | 8/2000 | Brooks | |
| 7,056,115 | B2 | 6/2006 | Phan et al. | |
| 9,280,854 | B2 | 3/2016 | Lauer | |
| 9,623,438 | B2 | 4/2017 | Moore | |
| 9,782,788 | B2 * | 10/2017 | Sais ...................... | B26F 1/44 |
| 9,855,707 | B2 * | 1/2018 | Jonietz, Jr. .............. | B29C 64/10 |
| 2010/0212586 | A1 * | 8/2010 | Sasaki ..................... | C09J 7/21 |
| | | | | 118/505 |
| 2011/0177250 | A1 * | 7/2011 | Jakimov ................. | C23C 4/01 |
| | | | | 118/504 |
| 2011/0297021 | A1 | 12/2011 | van Heijningen | |
| 2015/0283571 | A1 * | 10/2015 | Sais ......................... | B26F 1/44 |
| | | | | 83/13 |
| 2017/0136491 | A1 | 5/2017 | Chase et al. | |
| 2017/0173619 | A1 | 6/2017 | Moore | |
| 2017/0340086 | A1 | 11/2017 | Vrijburg | |
| 2020/0078954 | A1 * | 3/2020 | Penning ................. | B25J 9/0081 |
| 2021/0404079 | A1 * | 12/2021 | Xiao ...................... | H10K 71/00 |

FOREIGN PATENT DOCUMENTS

| | | |
|---|---|---|
| JP | 2005013987 A | 1/2005 |
| JP | 2016203075 A | 12/2016 |
| WO | WO2005085065 | 9/2005 |

OTHER PUBLICATIONS

Canadian Office Action dated Nov. 10, 2022 for Canada Application No. 3118874, 4 pages.
European Extended Search Report dated Jul. 25, 2022 for EP Application No. 19882541.6, 8 pages.

* cited by examiner

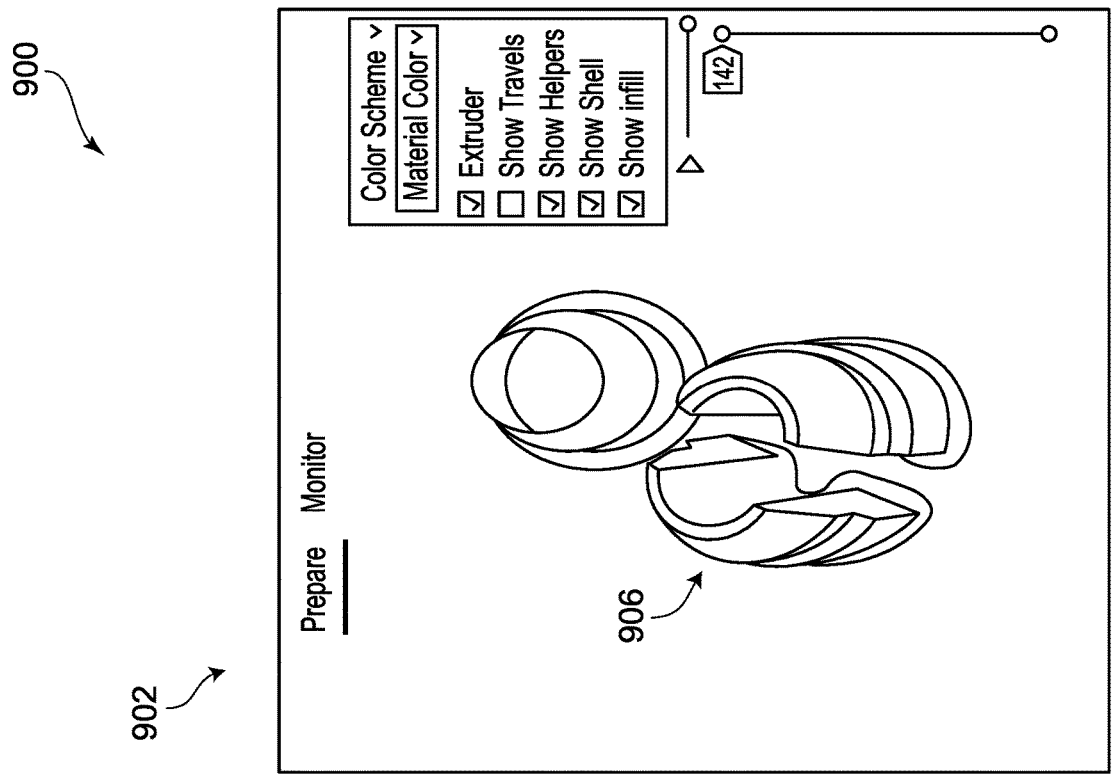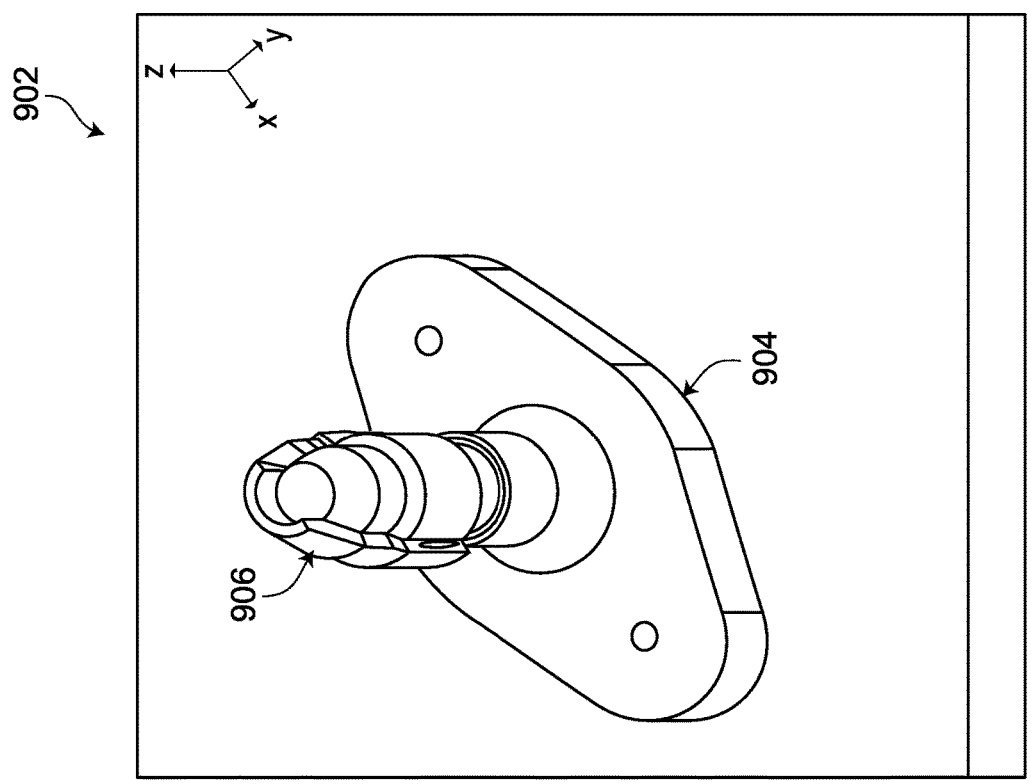
Fig. 9

SYSTEMS, DEVICES, AND METHODS FOR USE WITH AEROSPACE PARTS

CROSS-REFERENCE TO RELATED PATENT APPLICATIONS

This patent application claims a benefit of priority to PCT International Application PCT/US19/59814 filed Nov. 5, 2019; which claims a benefit of U.S. Provisional Patent Application 62/756,940 filed Nov. 7, 2018; each of which is incorporated herein in its entirety for all purposes.

TECHNICAL FIELD

This disclosure relates to various technologies for use with aerospace parts.

BACKGROUND

An aerospace part (e.g. an aerostructure) may need to be masked before a treatment (e.g. painting) for protection against the treatment. However, knowing where to mask the aerospace part may be complicated, time-consuming, error-prone, and laborious, especially when the aerospace part is geometrically complex or structurally monolithic. Additionally, the aerospace part may need to be treated precisely (e.g. laser ablation). However, knowing where to treat the aerospace part precisely may be complicated, time-consuming, error-prone, and laborious, especially when the aerospace part is geometrically complex or structurally monolithic. Moreover, the aerospace part may need to be redefined partially (e.g. drilling). However, knowing where to redefine the aerospace part partially may be complicated, time-consuming, error-prone, and laborious, especially when the aerospace part is geometrically complex or structurally monolithic.

SUMMARY

In an embodiment, a method comprises: creating a drawing of a stencil having an opening; manufacturing the stencil based on the drawing such that the stencil defines the opening therethrough; positioning the stencil onto an aerospace part such that the aerospace part is accessible through the opening; positioning a masking medium onto the aerospace part through the opening; removing the stencil from the aerospace part such that the masking medium remains on the aerospace part; and treating the aerospace part with the masking medium thereon.

In an embodiment, a method comprising: positioning a stencil having an opening onto an aerospace part such that the aerospace part is accessible through the opening; positioning a masking medium onto the aerospace part through the opening; removing the stencil from the aerospace part such that the masking medium remains on the aerospace part; and treating the aerospace part with the masking medium thereon.

In an embodiment, a system comprising: a building; an aerospace part positioned within the building; a stencil having an opening, wherein the stencil is positioned against the aerospace part within the building; and a masking medium positioned on the aerospace part within the opening.

In an embodiment, a method comprising: positioning a stencil having an opening onto an aerospace part such that the aerospace part is accessible through the opening; and ablating the aerospace part with a laser through the opening such that the aerospace part underneath the stencil is not ablated from the laser.

In an embodiment, a method comprising: positioning a stencil having an opening onto an aerospace part such that the aerospace part is accessible through the opening; and blasting the aerospace part with a medium through the opening such that the aerospace part underneath the stencil is not blasted from the medium.

In an embodiment, a method comprising: accessing a stencil having a body and a pair of arms, wherein the pair of arms extend from the body such that the body and the pair of arms define a U-shaped opening, wherein the pair of arms support a masking medium spanning therebetween and covering the opening; positioning the stencil onto an aerospace part while the stencil supports the masking medium such that the masking medium faces the aerospace part; applying a pressure onto the masking medium such that the masking medium contacts the aerospace part; and lifting the stencil from the aerospace part such that the masking medium remains on the aerospace part and does not span between the pair of arms.

In an embodiment, a method comprising: positioning a stencil having an opening onto an aerospace part such that the aerospace part is accessible through the opening; and redefining the aerospace part through the opening.

DESCRIPTION OF DRAWINGS

FIG. 9 shows an embodiment of a drawing of a masking medium that is tubularly-shaped in accordance with this disclosure.

DETAILED DESCRIPTION OF PREFERRED EMBODIMENTS

Figure 1:
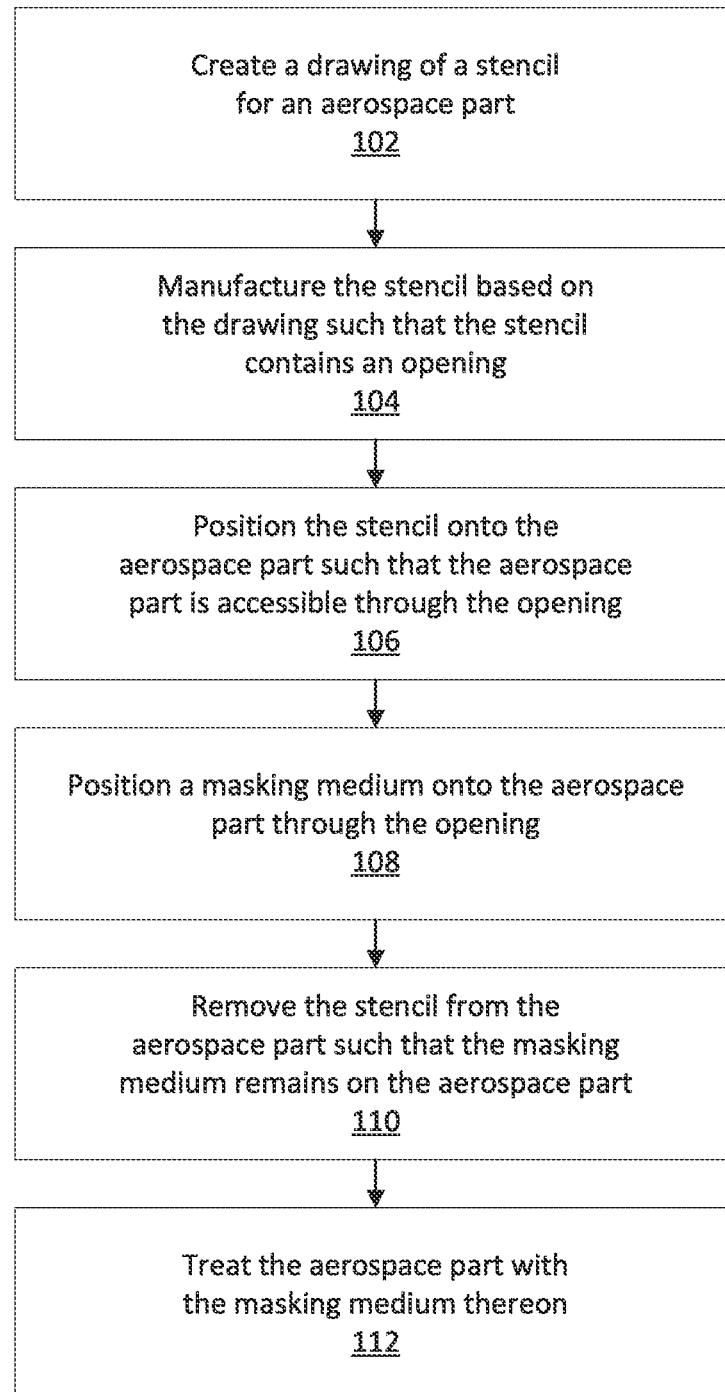
FIG. 1 shows a flowchart of an embodiment of a method of using a stencil in accordance with this disclosure.

Generally, this disclosure discloses various systems, devices, and methods for use with aerospace parts. In particular, an aerospace part (e.g. an aerostructure) can be used during an initial assembly or a repair of an aerospace vehicle. For example, the aerospace vehicle can include aircraft, spacecraft, missiles, bombs, rockets, drones, and others. For example, the aerospace part can include a frame, a skin, a flight control surface, a foil, a cowling, a blade, a fin, a wing, a tail, a landing gear, a fuselage, an aileron, a winglet, an elevator, a stabilizer, a rudder, a flap, an air brake, a slat, a spoiler, an aircraft canopy, a turbine, a door, a fuel tank, a component of any of foregoing, or others. For example, the aerospace part can include an aileron, an air inlet, a boarding ladder, a bomb door, a bracket, a bulkhead, a control surface, a crew floor, a door, an elevator, an empennage, an engine cowl, an engine mount, an entry door, a fairing, a fin, a flap, a floor beam, a floor, a foil, a fuel cell, a fuel floor, a fuel tank, a fuselage, a gun door, a hinge, an instrument panel, a landing gear, a latch, a longeron, a nose, a nosecone, a pylon, a rib, a rudder, a skin, a spar, a spoiler, a stabilizer, a stringer, a tail, a thermal protector, a wheel well, a wing box, a wing, a winglet, or others. For example, the aerospace part can include metal, plastic, rubber, glass, silicon, carbon, epoxy, resin, thermoplastic, or others. For example, metal can include steel, stainless steel, titanium, aluminum, iron, tungsten, chrome, vanadium, copper, brass, bronze, zinc, tin, niobium, molybdenum, hafnium, chromium, carbide, boride, nickel, gold, silver, tantalum, platinum, zirconium, an alloy of any of foregoing, a composite of any of foregoing, or others.

During the initial assembly or the repair, the aerospace part may need to be treated mechanically, chemically, electrically, thermally, photonically, or others. For example, this treatment can protect against corrosion, enhance or inhibit electrical conductivity, aid in non-destructive testing, or others. For example, the aerospace part may be treated with a coating of paint (e.g. primer, top coat, Teflon finish, sol gel conversion coating, solid film lube, dry film lube), an anticorrosion agent (e.g. gas, liquid, gel), an anti-scratch film, an immersion in a solution, or others. For example, the treatment may involve layering, coating, spraying, etching, sanding, bathing, immersing, heating, cooling, shocking, illuminating, drilling, boring, media blasting, abrasive blasting, laser ablation, or others. For example, the aerospace part can be non-destructively tested, which can include via magnetic particle inspection, fluorescent penetrant inspection, hardness/conductivity testing, copper sulfate testing, salt spray testing, water immersion testing, high humidity testing, etching, anodic coating, or others. For example, the aerospace part can be wet processed via immersions into chemical solutions in order to clean, decontaminate, increase corrosion resistance (e.g. Alodine application), improve surface hardness, and promote paint adhesion. For example, wet processing can include aluminum processing via alkaline cleaning, anodizing (e.g. chromic acid, boric sulfuric acid, sulfuric acid, tartaric acid) chromate conversion coating, or others. For example, wet processing can include steel processing via passivation. For example, wet processing can include titanium processing via phosphate fluorides.

There are situations when engineering details specify that certain sections of the aerospace part are to be treated differently or not at all. For example, the engineering details may specify that certain sections of the aerospace part receive treatments different from other sections of that same part. For example, the engineering details may specify an area measured within thousands of an inch from various edges of the aerospace part that is not to be painted. As such, those sections that ought to be protected from a particular treatment or treated differently or not at all may be masked via a masking medium. Similar state of being exists during iterative, alternating, or consecutive treatments, when some sections of the aerospace part may need to be masked with the masking medium between at least two of those treatments.

The masking medium can be embodied in various ways. For example, the masking medium can include an adhesive sticker or tape, a sprayed fluid, a layer of foam, a sealant, a vinyl cutout, a liquid maskant, a goop or gel maskant, a rubber, plastic, metal, gel, or foam plug, a plastic form, a sheet of paper, or others. For example, the adhesive sticker or tape can include a vinyl adhesive that effectively prevents a coating of paint from coming into contact with a specified section of the aerospace part.

When the aerospace part is geometrically complex or structurally monolithic, there are few, if any, reliable and simple visual reference points for positioning the masking medium. For example, if the aerospace part is geometrically complex or structurally monolithic, then a user can utilize various metrology equipment, such as scales or calipers, to locate specific masking sections. Likewise, the user can use Mylar transparencies and vinyl cutouts sourced from a vinyl plotter as an inspection tool to verify that the masking medium was correctly placed. However, the Mylar transparencies and vinyl cutout templates are often improperly used and easily damaged. Similarly, manual measuring leads to a greater margin for error, high masking time, or inconsistency. For example, if the aerospace part is geometrically complex or structurally monolithic, then the aerospace part can be accurately masked on a first try at about 65% rate, which, on average, can result in about 45 minutes of additional inspector and rework time, especially when tolerances as little as 0.003 inches need to be kept. Resultantly, locating the sections of the aerospace part for positioning the masking medium is complicated, time-consuming, error-prone, and laborious.

Similarly, there are situations when certain sections of the aerospace part need to be treated precisely. For example, such treatment can include precise removal of certain previously applied treatments, such as via laser ablation, abrasive blasting, or others. However, when the aerospace part is geometrically complex or structurally monolithic, there are few, if any, reliable and simple visual reference points for identifying those sections, especially after several treatments or in-between treatments. Resultantly, locating the sections of the aerospace for precise treatment is complicated, time-consuming, error-prone, and laborious.

Likewise, there are situations when certain sections of the aerospace part need to be redefined partially. For example, the aerospace may need to be drilled or bored for holes in specific areas for insertion of various elongated members, such as rivets, screws, or bolts, to join parts together to form subassemblies of an aerospace vehicle. However, when the aerospace part is geometrically complex or structurally monolithic, there are few, if any, reliable and simple visual reference points for identifying those sections. Resultantly, locating the sections of the aerospace for partial redefinition is complicated, time-consuming, error-prone, and laborious.

These technical problems are generally solved by positioning a stencil (e.g. masking template) onto or over the aerospace part or vice versa, whether with or without contact therewith, whether the stencil is specific to the aerospace part or generic to the aerospace part. As such, in terms of knowing where to mask the aerospace part prior to treatment (e.g. painting), when the stencil is positioned onto or over the aerospace part or vice versa, the stencil can visibly guide positioning of the masking medium onto the aerospace part. Likewise, in terms of knowing where to treat the aerospace part precisely (e.g. laser ablation), when the stencil is positioned onto or over the aerospace part or vice versa, the stencil can visibly guide this precise treatment of the aerospace part. Similarly, in terms of knowing where to redefine the aerospace part partially (e.g. drilling), when the stencil is positioned onto or over the aerospace part or vice versa, the stencil can visibly guide this partial redefinition of the aerospace part.

In particular, these solutions can be performed in various ways. For example, a user can operate a software application at a computer terminal (e.g. a desktop, laptop, tablet, smartphone). The software application is operated such that the software application enables a formation of a drawing of the stencil for the aerospace part. For example, the software application can include a CATIA application programmed for computer-aided design (CAD), computer-aided manufacturing (CAM), computer-aided engineering (CAE), product lifecycle management (PLM) and 3D modeling. For example, the software application can include a Cura application programmed for 3D printer slicing application in order to manufacture the stencil, which can include a thermoplastic, a polyamide, an elastomer, a polylactic acid (PLA), an acrylonitrile butadiene styrene (ABS), a polypropylene (PP), a polycarbonate (PC), a nylon, a carbon fiber, a fiberglass, a thermoplastic polyurethane (TPU), a thermoplastic elastomer (TPE), a polyethylene terephthalate (PET), or others.

The stencil is manufactured based on the drawing sourced from the software application such that the stencil contains or defines an area, such an opening, a bay (e.g. U-shape, C-shape, J-shape), or others. The area visibly guides where the masking medium can be or is positioned on the aerospace part when the stencil is positioned over or sits on the aerospace part or vice versa. Consequently, the stencil can enable a precise, conforming, custom, or snug physical fit over or onto the aerospace part or vice versa so as to accurately locate the sections of the aerospace part to be masked by the masking medium. For example, the stencil can define an opening therethrough such that the masking medium can be deposited on the aerospace part through the opening when the stencil rests on the aerospace part or vice versa. For example, the stencil can be embodied as a reusable or custom mold that precisely fits the aerospace part. For example, the stencil can increase at least some aerospace part quality due to accuracy and decrease at least some amount of labor needed to complete masking operations, especially since at least some repeatability of masking operations can be improved. For example, when the stencil is utilized, a user can quickly and visually locate the sections where the masking medium should be applied and then apply the masking medium. For example, if the aerospace part is geometrically complex, then the aerospace part can be masked in about 5 minutes, on average, when the stencil is used for application of the masking medium. Therefore, the stencil can function as a visible guide for accurately locating the sections of the aerospace part to be masked by the masking medium when the stencil is positioned over or sits on the aerospace part or vice versa. Consequently, the stencil can be designed and created to precisely apply masking in specific locations of the aerospace part.

Likewise, in terms of knowing where to treat the aerospace part precisely (e.g. laser ablation), when the stencil is positioned onto or over the aerospace part or vice versa, the stencil can visibly guide this precise treatment of the aerospace part through the opening of the stencil. Similarly, in terms of knowing where to redefine the aerospace part partially (e.g. drilling), when the stencil is positioned onto or over the aerospace part or vice versa, the stencil can visibly guide this partial redefinition of the aerospace part through the opening of the stencil.

The stencil can be manufactured via an additive manufacturing process, a subtractive manufacturing process, a physical assembly process, or others. For example, the additive manufacturing process or the subtractive manufacturing process can include 3D printing, fused filament fabrication, fused deposition modeling, material extrusion, directed energy deposition, material jetting, binder jetting, sheet lamination, vat polymerization, powder bed fusion, laser sintering, metal casting, laser cutting, computer numerical control (CNC) router-based cutting, or others. For example, if the stencil is 3D printed or manufactured via another form of manufacturing process, whether additive or subtractive, then the stencil can include a thermoplastic, a polyamide, an elastomer, a PLA, an ABS, a PP, a PC, a nylon, a carbon fiber, a fiberglass, a TPU, a TPE, a PET, or others. For example, when the stencil is 3D printed or manufactured via another form of manufacturing process, whether additive or subtractive, then the stencil can be used to quickly and precisely identify specific locations on surfaces of aerospace parts for (i) masking these locations from paint or chemical processing, (ii) guiding hole drilling, laser ablation, abrasive blasting, or other treatments, or (iii) inspecting.

This disclosure is now described more fully with reference to FIGS. 1-22, in which various example embodiments of this disclosure are shown. This disclosure can be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

FIG. 1 shows a flowchart of an embodiment of a method of using a stencil in accordance with this disclosure. In particular, a method 100 includes a set of blocks 102-112, which can involve any content of FIGS. 2-22.

In block 102, a drawing of a stencil (e.g. masking template) is created for an aerospace part. The drawing can be created via manually or automatically. For example, the drawing can be created manually by drawing with a pen, a pencil, a marker, a chalk, or a crayon on a piece of paper, a whiteboard, a blackboard, a napkin, or others. For example, the drawing can be created automatically by a software application operated by a user. For example, the software application can include a CATIA application programmed for CAD, CAM, CAE, PLM and 3D modeling. For example, the software application can include a Cura application programmed for 3D printer slicing application. For example, the aerospace part (e.g. aerostructure) can include a frame, a skin, a flight control surface, a foil, a cowling, a blade, a fin, a wing, a tail, a landing gear, a fuselage, an aileron, a winglet, an elevator, a stabilizer, a rudder, a flap, an air brake, a slat, a spoiler, an aircraft canopy, a turbine, a door, a fuel tank, a component of any of foregoing, or others. For example, the aerospace part can include an aileron, an air inlet, a boarding ladder, a bomb door, a bracket, a bulkhead, a control surface, a crew floor, a door, an elevator, an empennage, an engine cowl, an engine mount, an entry door, a fairing, a fin, a flap, a floor beam, a floor, a foil, a fuel cell, a fuel floor, a fuel tank, a fuselage, a gun door, a hinge, an instrument panel, a landing gear, a latch, a longeron, a nose, a nosecone, a pylon, a rib, a rudder, a skin, a spar, a spoiler, a stabilizer, a stringer, a tail, a thermal protector, a wheel well, a wing box, a wing, a winglet, or others. For example, the aerospace part can include metal, plastic, rubber, glass, silicon, carbon, epoxy, resin, thermoplastic, or others. For example, metal can include steel, stainless steel, titanium, aluminum, iron, tungsten, chrome, vanadium, copper, brass, bronze, zinc, tin, niobium, molybdenum, hafnium, chromium, carbide, boride, nickel, gold, silver, tantalum, platinum, zirconium, an alloy of any of foregoing, a composite of any of foregoing, or others. For example, the aerospace vehicle can include aircraft, spacecraft, missiles, bombs, rockets, drones, and others. For example, the software application can be used to create the drawing of the stencil, project a set of locations in the drawing of the stencil, and define a set of openings based on the set of locations for rapid prototyping of the stencil, such as via an additive manufacturing technique or others.

In block 104, the stencil is manufactured based on the drawing such that the stencil contains an opening therethrough. As such, the stencil can operate as a stencil. The stencil can be manufactured manually or automatically. For example, the stencil can be manufactured manually based on a user using a hand tool, a construction tool, or others. For example, the stencil can be manufactured automatically, such as via a manufacturing machine controlled via a computer operated by a user. For example, the stencil can be manufactured via an additive manufacturing process, a subtractive manufacturing process, a physical assembly process, or others. For example, the additive manufacturing process or the subtractive manufacturing process can include 3D printing, fused filament fabrication, fused deposition modeling, material extrusion, directed energy deposition, material jetting, binder jetting, sheet lamination, vat polymerization, powder bed fusion, laser sintering, metal casting, laser cutting, CNC router-based cutting, or others. For example, if the stencil is 3D printed or manufactured via another form of manufacturing process, whether additive or subtractive, then the stencil can include a thermoplastic, a polyamide, an elastomer, a PLA, an ABS, a PP, a PC, a nylon, a carbon fiber, a fiberglass, a TPU, a TPE, a PET, or others. For example, the subtractive manufacturing can include numerical control (NC) processing, stamping, drilling, sanding, routing, or others. For example, the physical assembly process can include at least two parts being fastened, mated, adhered, stapled, nailed, bonded, interlocked, or others, whether the physical assembly is performed manually or automatically. For example, the stencil can be structured as a jigsaw puzzle, which can be helpful in difficult to reach areas.

The opening can be closed-shaped, such as an o-shape, D-shape, Q-shape, or others. The opening can be open-shaped, such as U-shape, C-shape, V-shape, or others. The opening can be symmetrical or asymmetrical. The opening can be polygonal, corner-less, oval, circular, ovoid, elliptical, square, rectangular, triangular, pentagonal, octagonal, hexagonal, trapezoidal, tapering, star-shaped, crescent shape, cross-shaped, or others. The stencil can include an edge portion hosting a bay that can be a U-shaped, C-shaped, V-shaped, W-shaped, Y-shaped, S-shaped, F-shaped, J-shaped, L-shaped, Z-shaped, N-shaped, or M-shaped.

In block 106, the stencil is positioned over or onto the aerospace part such that the aerospace part is accessible through the opening. When the stencil contains the bay (e.g. U-shape, C-shape, J-shape), then the stencil is positioned over or onto the aerospace part such that the aerospace part is accessible through the bay. The stencil can be positioned over the aerospace part, while avoiding contact therewith or vice versa, such as via suspension, flotation, levitation, or others. The stencil can be positioned onto the aerospace part and thereby contact the aerospace part or vice versa. For example, the stencil can be deposited onto the aerospace part such that the stencil can enable a precise, conforming, custom, or snug physical fit with the aerospace part or vice versa. The stencil can be positioned over or onto the aerospace part manually via a user action, such as handling, grasping, lifting, raising, inserting, mounting, releasing, or others. The stencil can be positioned over or onto the aerospace part automatically via a robot or machine action, such as handling, grasping, lifting, raising, inserting, mounting, releasing, or others.

In block 108, a masking medium is positioned onto the aerospace part through the opening such that the masking medium remains on the aerospace part and accessible through the opening. For example, the masking medium can be visible or touchable through the opening. When the stencil contains the bay, then the masking medium is positioned onto the aerospace part through the bay such that the masking medium remains on the aerospace part and accessible through the bay. For example, the masking medium can be visible or touchable through the bay.

The masking medium can include an adhesive sticker or tape, a sprayed fluid, a layer of foam, a sealant, a vinyl cutout, a liquid maskant, a goop or gel maskant, a rubber, plastic, metal, gel, or foam plug, a plastic form, a sheet of paper, or others. The masking medium can be positioned manually or automatically. The masking medium can be positioned manually or automatically. For example, the masking medium can be positioned manually via a user action, such as handling, grasping, lifting, raising, inserting, mounting, releasing, or others. For example, the masking medium can be positioned automatically via a robot or machine action, such as handling, grasping, lifting, raising, inserting, mounting, releasing, or others. For example, the robot or machine action can be based on a computational detection of the opening or the bay. For example, the masking medium can be positioned onto the aerospace part through the opening based on the computational detection of the opening. For example, the computational detection involves at least one of a camera, a microphone, an ultrasonic sensor, a laser, a LIDAR, a radar, a proximity sensor, an spectrometer, an infrared sensor, a distance sensor, or a heat sensor.

In block 110, the stencil is removed from the aerospace part such that the masking medium remains on the aerospace part. The stencil can be removed manually or automatically. For example, the stencil can be removed manually via a user action, such as handling, grasping, lifting, raising, inserting, mounting, releasing, or others. For example, the stencil can be removed automatically via a robot or machine action, such as handling, grasping, lifting, raising, inserting, mounting, releasing, or others. For example, the stencil can be removed via a suction cup, a magnet, a hook-and-loop interface, a hook, a claw, or others, whether the stencil is removed manually or automatically.

In block 112, the aerospace part is treated with the masking medium thereon such that the masking medium protects the aerospace part underneath the masking medium. The aerospace part can be treated mechanically, chemically, electrically, thermally, photonically, or others. For example, the aerospace part may be treated with a coating of paint (e.g. primer, top coat, Teflon finish, sol gel conversion coating, solid film lube, dry film lube), an anticorrosion agent (e.g. gas, liquid, gel), an anti-scratch film, an immersion in a solution, or others. For example, the treatment may involve layering, coating, spraying, etching, sanding, bathing, immersing, heating, cooling, shocking, illuminating, or others.

Figure 2:
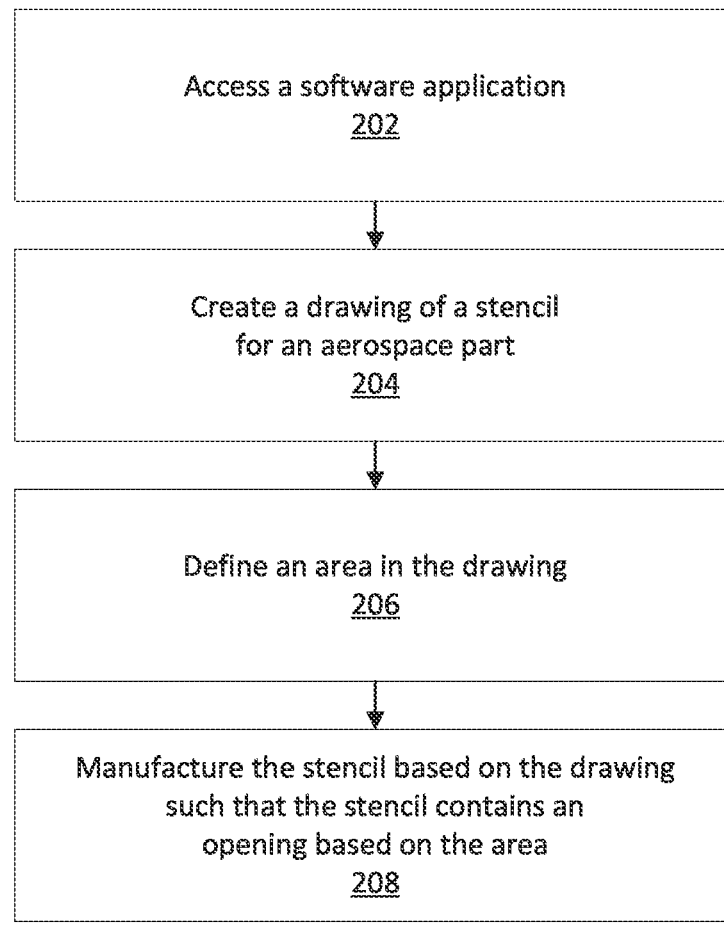
FIG. 2 shows a flowchart of an embodiment of a method of manufacturing a stencil in accordance with this disclosure.

FIG. 2 shows a flowchart of an embodiment of a method of manufacturing a stencil in accordance with this disclosure. In particular, a method 200 includes a set of blocks 202-208.

In block 202, a user accesses a software application, as described herein.

In block 204, the user operates the software application to create a drawing of a stencil for an aerospace part, as described herein.

In block 206, the user operates the software application to define an area in the drawing of the stencil.

In block 208, the user manufactures the stencil based on the drawing such the stencil containing an opening based on the area. Note that the stencil can also contain a bay (e.g. U-shape, C-shape, J-shape) based on the area. As such, the stencil can operate as a stencil for applying a masking medium onto the aerospace part through the opening or the bay.

Figure 3:
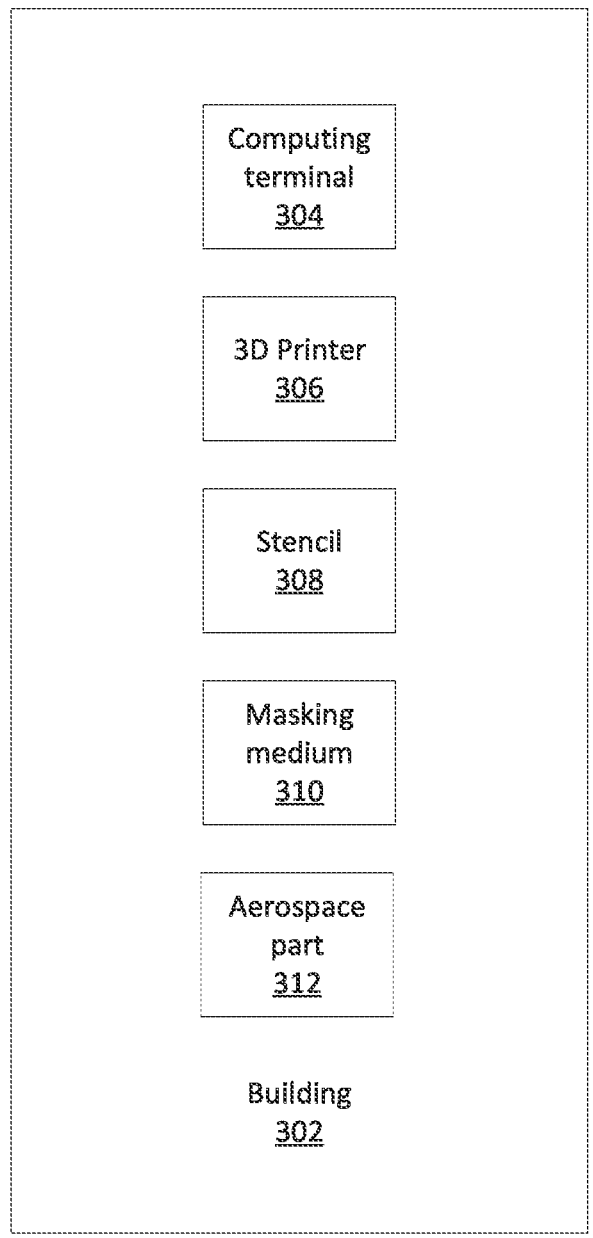
FIG. 3 shows a schematic of an embodiment of a defined area for using a stencil in accordance with this disclosure.

FIG. 3 shows a schematic of an embodiment of a defined area for using a stencil in accordance with this disclosure. In particular, a defined area 300 includes a building 302 (e.g. warehouse, hangar, skyscraper) containing a computing terminal 304, a 3D printer 306, a stencil 308, a masking medium 310, and an aerospace part 312. In some situations, whether additional or alternative to the building 302, the defined area 300 can include other areas, whether indoors or outdoors, such as a basement, a tent, a garage, a bunker, or a land, aerial, space, or marine vehicle.

In the building 300, the computing terminal 304 is used to create a drawing of a stencil, as described herein, and is in communication with the 3D printer 306. The 3D printer 306 3D prints the stencil 308 based on the drawings sourced from the computing terminal 304 such that the stencil 308 defines an opening therethrough. The stencil 308 is placed onto the aerospace part 312 such that the aerospace part 312 is accessible through the opening of the stencil 308. Subsequently, the masking medium 310 is placed onto the aerospace part 312 through the opening of the stencil 308. The stencil 308 is removed from the aerospace part 312 such that the masking medium 310 remains on the aerospace part 312. The aerospace part 312 is treated with the masking medium thereon, as described herein. For example, the aerospace part 312 can be treated internal to the building 312 or external to the building 312.

Figure 4:
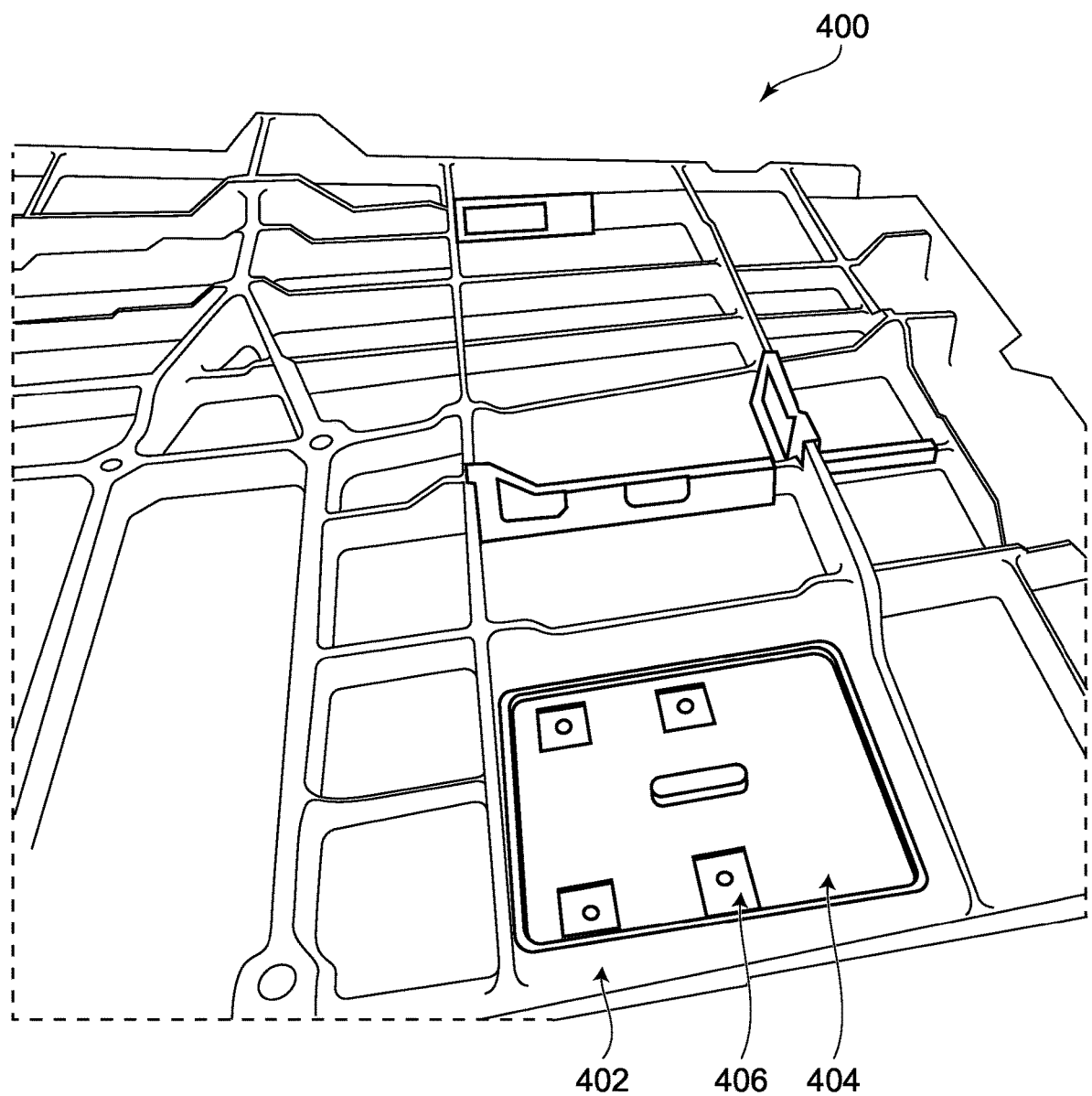
FIG. 4 shows an embodiment of a stencil that is tray-shaped in accordance with this disclosure.

FIG. 4 shows an embodiment of a stencil that is tray-shaped in accordance with this disclosure. In particular, an aerospace part 400 contains a plurality of cells 402 of equal and unequal area and volume. One of the cells 402 snugly hosts a stencil 404, which is tray-shaped, as defined via a floor and a plurality of walls extending from the floor. The floor defines a plurality of openings 406 therethrough such that the wall extends about the openings 406. As such, when a plurality of masking mediums (e.g. identical mediums, non-identical mediums) are applied onto the aerospace part 400, then the masking mediums are positioned onto one of the cells 402 through the openings 406. Note that other the aerospace part 400 hosts other stencils that are mounted onto the cells 402. For example, some of such stencils can include a U-shaped slot for mating with a wall of a cell 402.

Figure 5:
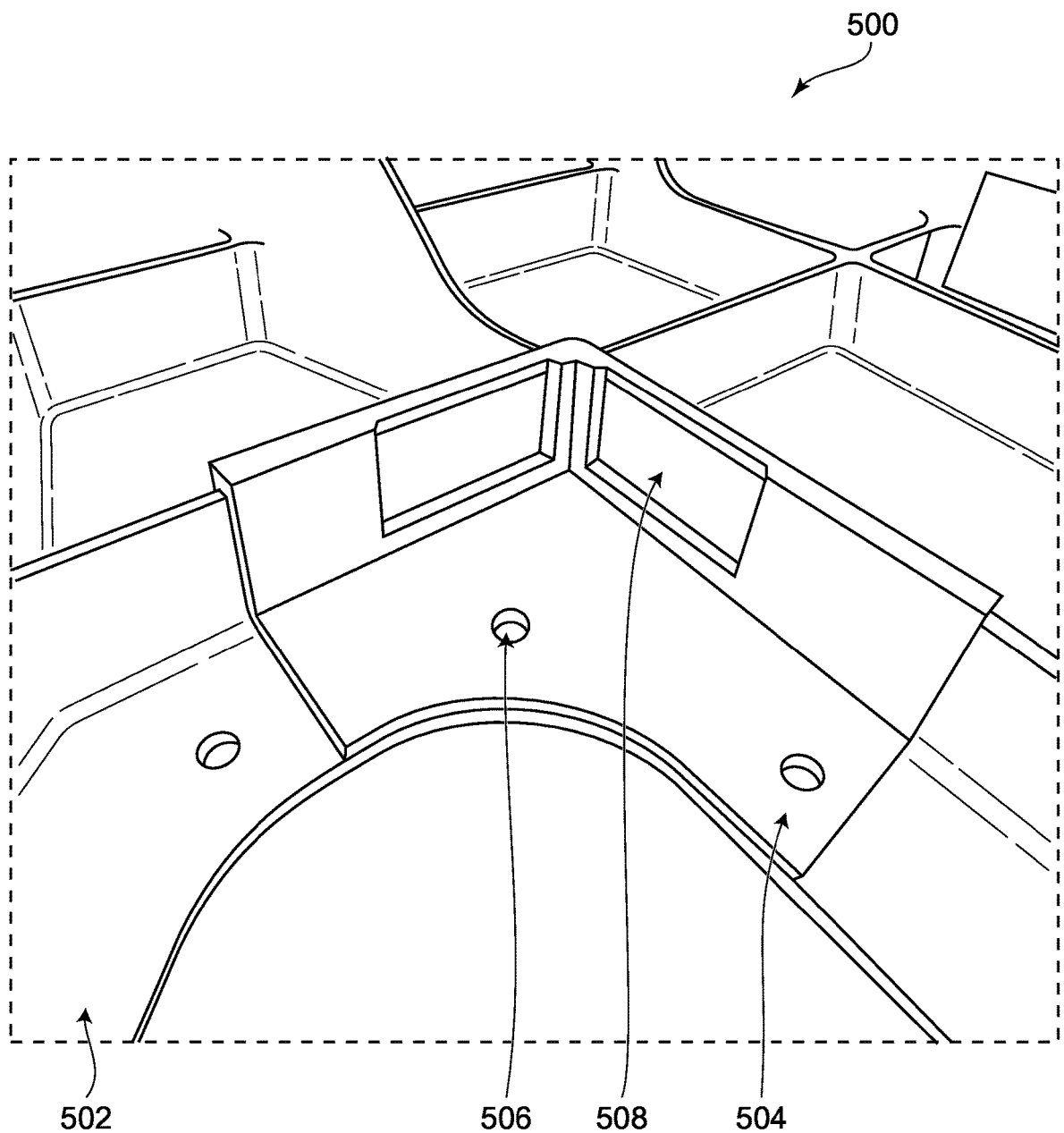
FIG. 5 shows an embodiment of a stencil that is corner-shaped in accordance with this disclosure.

FIG. 5 shows an embodiment of a stencil that is corner-shaped in accordance with this disclosure. In particular, an aerospace part 500 contains a plurality of cells 502 of equal and unequal area and volume. One of the cells 502 has an inner corner hosting a stencil 504, which is correspondingly corner-shaped, as defined via a floor and a pair of walls, where the pair of walls extend from the floor and contact each other. Note that the stencil 504 is corner-shaped at an angle of less than about 90 degrees, about 90 degrees, or less than about 180 degrees. The pair of walls can acutely, obtusely, or perpendicularly extend from the floor. The pair of walls can acutely, obtusely, or perpendicularly contact each other. Each wall of the pair of walls can include a U-shaped slot structured for mounting onto one of the cells 502 (e.g. over wall). The floor and the pair of walls define a plurality of openings 506 therethrough. A plurality of masking mediums 508 (e.g. identical mediums, non-identical mediums) are applied onto the one of the cells 502 through the openings 506. Note that the stencil 504 can be structured to be positioned within multiple adjoining cells 502, such as at least two, three, four, or more.

Figure 6:
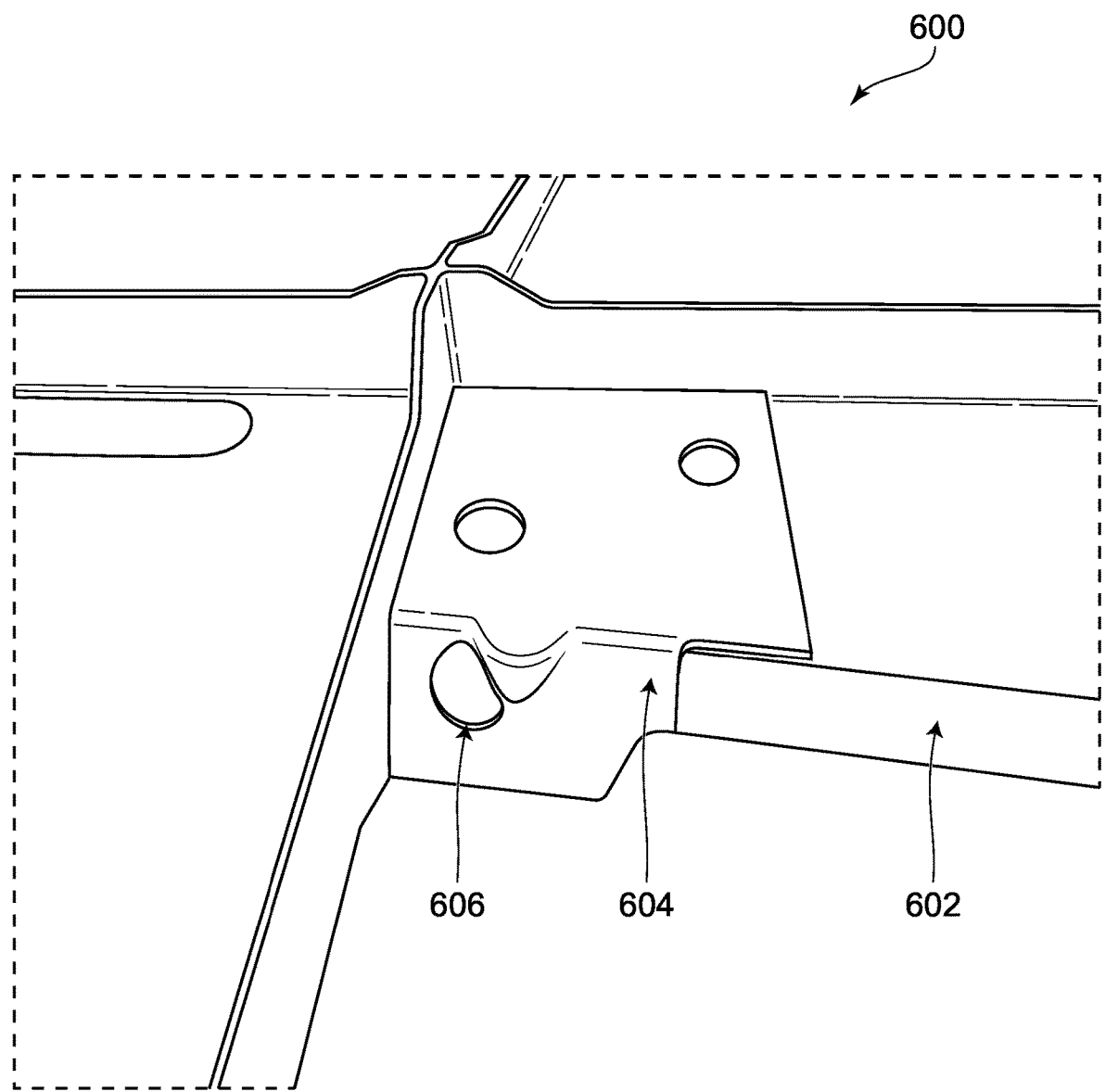
FIG. 6 shows an embodiment of a stencil that is L-shaped in accordance with this disclosure.

FIG. 6 shows an embodiment of a stencil that is L-shaped in accordance with this disclosure. In particular, an aerospace part 600 includes a plurality of cells 602 of equal and unequal area and volume. One of the cells 602 hosts a stencil 604, which is L-shaped, as defined via a pair of plates. The pair of plates defines a plurality of openings 606 therethrough. As such, when a plurality of masking mediums (e.g. identical mediums, non-identical mediums) are applied onto the aerospace part 600, then the masking mediums are positioned onto one of the cells 602 through the openings 606.

Figure 7:
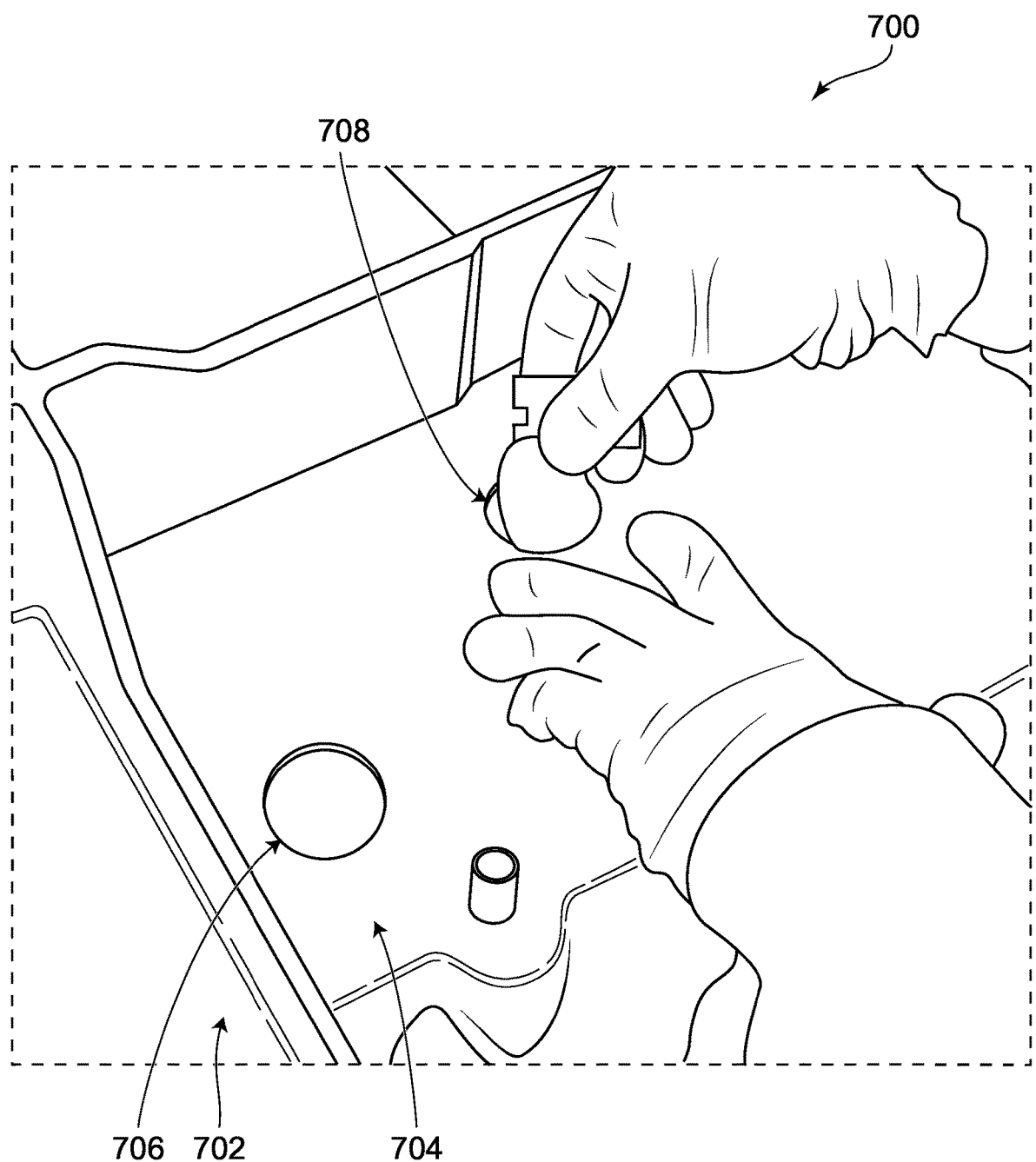
FIG. 7 shows an embodiment of a masking sticker being applied onto an aerospace part through an opening of a stencil in accordance with this disclosure.

FIG. 7 shows an embodiment of a masking sticker being applied onto an aerospace part through an opening of a stencil in accordance with this disclosure. In particular, an aerospace part 700 includes a plurality of cells 702 of equal and unequal area and volume. One of the cells 702 hosts a stencil 704, which is L-shaped, as defined via a pair of plates. The pair of plates defines a plurality of openings 706 therethrough. A masking sticker 708 is being manually applied onto one of the cells 702 through one of the openings 706 such that the masking sticker 708 remains on one of the cells 702 when the stencil 704 is lifted or raised from one of the cells 702. Also, note that one of the cells 702 already hosts a masking plug (black tubular protrusion away from the aerospace part 700) in one of the openings 706. Consequently, the masking sticker 708 and the masking plug can protect one of the cells 708 from treatment when the aerospace part 700 is treated, as described herein.

Figure 8:
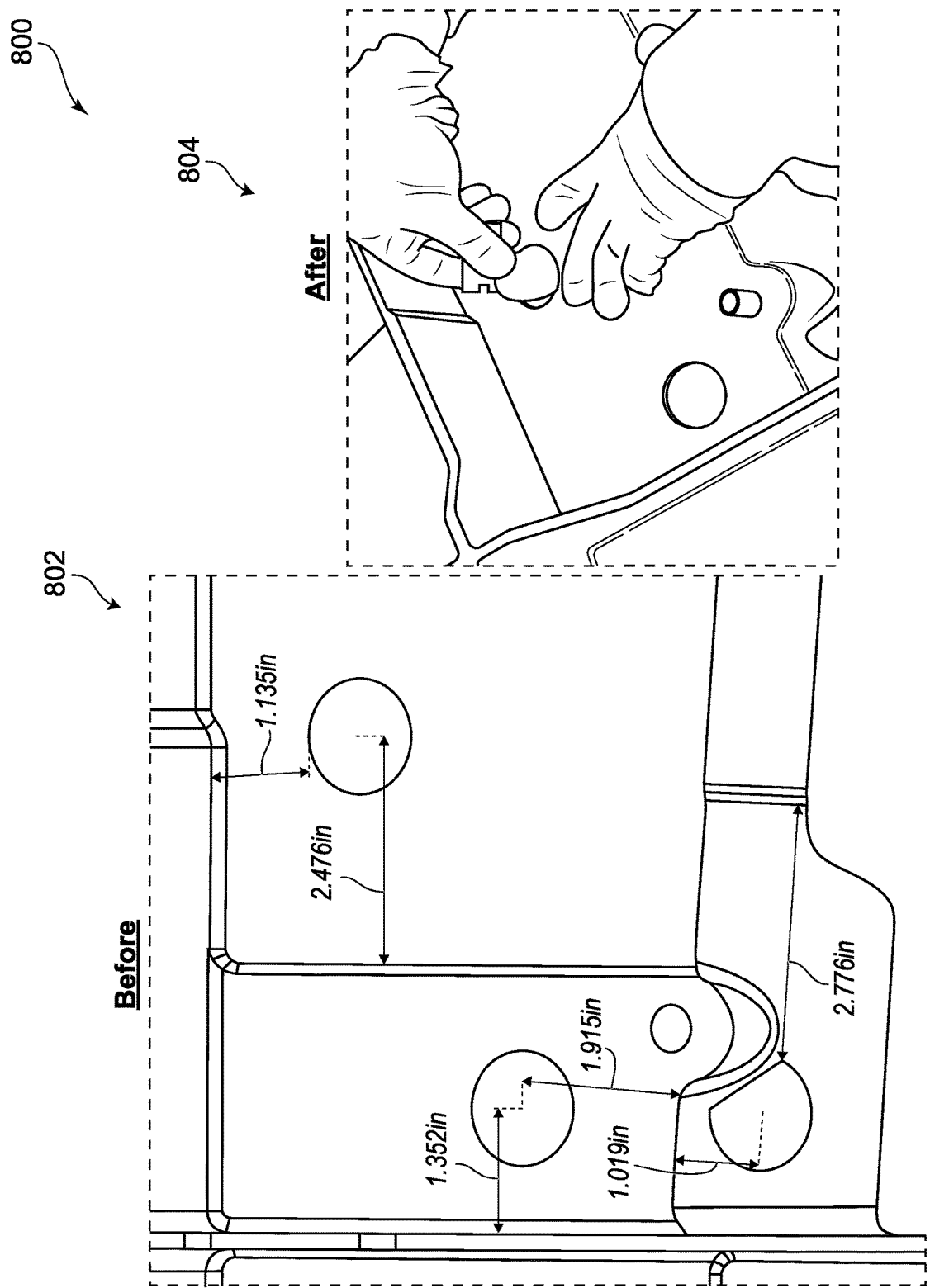
FIG. 8 shows an embodiment of a process of applying a masking medium without a stencil and a process of applying a masking medium with a stencil in accordance with this disclosure.

FIG. 8 shows an embodiment of a process of applying a masking medium without a stencil and a process of applying a masking medium with a stencil in accordance with this disclosure. In particular, a comparison 800 illustrates a process 802 of applying a masking medium without a stencil and a process 804 of applying a masking medium with a stencil.

Relative to the process 802 when the aerospace part is geometrically complex or structurally monolithic, there are few, if any, reliable and simple visual reference points for positioning the masking medium. For example, if the aerospace part is geometrically complex or structurally monolithic, then a user can utilize various metrology equipment, such as scales or calipers, to locate specific masking sections. Likewise, the user can use Mylar transparencies and vinyl cutouts sourced from a vinyl plotter as an inspection tool to verify that the masking medium was correctly placed. However, the Mylar transparencies and vinyl cutout templates are often improperly used and easily damaged. Similarly, manual measuring leads to a greater margin for error and inconsistency. For example, if the aerospace part is geometrically complex or structurally monolithic, then the aerospace part can be accurately masked on a first try at about 65% rate, which, on average, can result in about 45 minutes of additional inspector and rework time, especially when tolerances as little as 0.003 inches need to be kept. Resultantly, locating the sections of the aerospace part for positioning the masking medium is complicated, time-consuming, and laborious.

In contrast, relative to the process 804, a stencil that visibly guides positioning of the masking medium onto the aerospace part when the stencil is positioned over or sits on the aerospace part or vice versa. The stencil is manufactured such that the stencil contains or defines an area, such an opening, a bay, or others. The area visibly guides positioning of the masking medium onto the aerospace part when the stencil is positioned over or sits on the aerospace part or vice versa. The stencil can be configured for a precise, conforming, custom, or snug physical fit over or onto the aerospace part or vice versa so as to accurately locate the sections of the aerospace part to be masked by the masking medium. For example, the stencil can define an opening therethrough such that the masking medium can be deposited on the aerospace part through the opening when the stencil rests on the aerospace part or vice versa. For example, the stencil can include a reusable or custom mold that precisely fits the aerospace part. For example, the stencil can increase aerospace part quality due to accuracy and decrease an amount of labor needed to complete masking operations, especially since at least some repeatability of masking operations is improved. For example, when the stencil is utilized, the user can quickly locate the sections where the masking medium should be applied and then apply the masking medium. For example, if the aerospace part is geometrically complex or structurally monolithic, then the aerospace part can be masked in about 5 minutes, on average, or about 90% less time when the stencil is used for application of the masking medium, compared to other methods. Therefore, the stencil can function as a visible guide for accurately locating the sections of the aerospace part to be masked by the masking medium when the stencil is positioned over or sits on the aerospace part or vice versa.

FIG. 9 shows an embodiment of a drawing of a masking medium that is tubularly-shaped in accordance with this disclosure. In particular, an illustration 900 shows a plurality of screenshots 902 of a software application. The screenshots 902 show a masking medium 906 structured for mounting onto a tubular projection of an aerospace part 904. The masking medium 906 is tubularly-shaped and can have a uniform or varying internal or external surface diameter. The masking medium 906 can be internally or externally threaded (e.g. clockwise or counterclockwise) or smooth or textured. For example, since masking around threads is laborious, time-consuming, and error-prone, when the masking medium 906 is shaped as a clasping cap, then such configuration enables a precise, conforming, custom, or snug physical fit around the threads to ensure that the tubular projection of the aerospace part 904 is masked properly when initially applied. In addition, using the masking medium 906 can reduce at least some cost of masking material since the masking medium 906 is reusable.

The masking medium 906 can be defined via a pair of C-shaped or U-shaped portions that can selectively couple to each other with the tubular projection being positioned therebetween. For example, the pair of C-shaped or U-shaped portions can selectively couple, engage, or mesh to each other via fastening, interlocking, mating, adhering, mounting, hook-and-looping, suction cupping, magnetizing, or others. However, note that the masking medium 906 can be a unitary piece as well. Further, there can be a plurality of masking mediums 906 (e.g. identical mediums, non-identical mediums) stacked one upon another on the tubular projection of the aerospace part 904. Moreover, note that a stencil can be structured as the masking medium 906, such as by defining an opening or a bay on a sidewall thereof.

Figure 10:
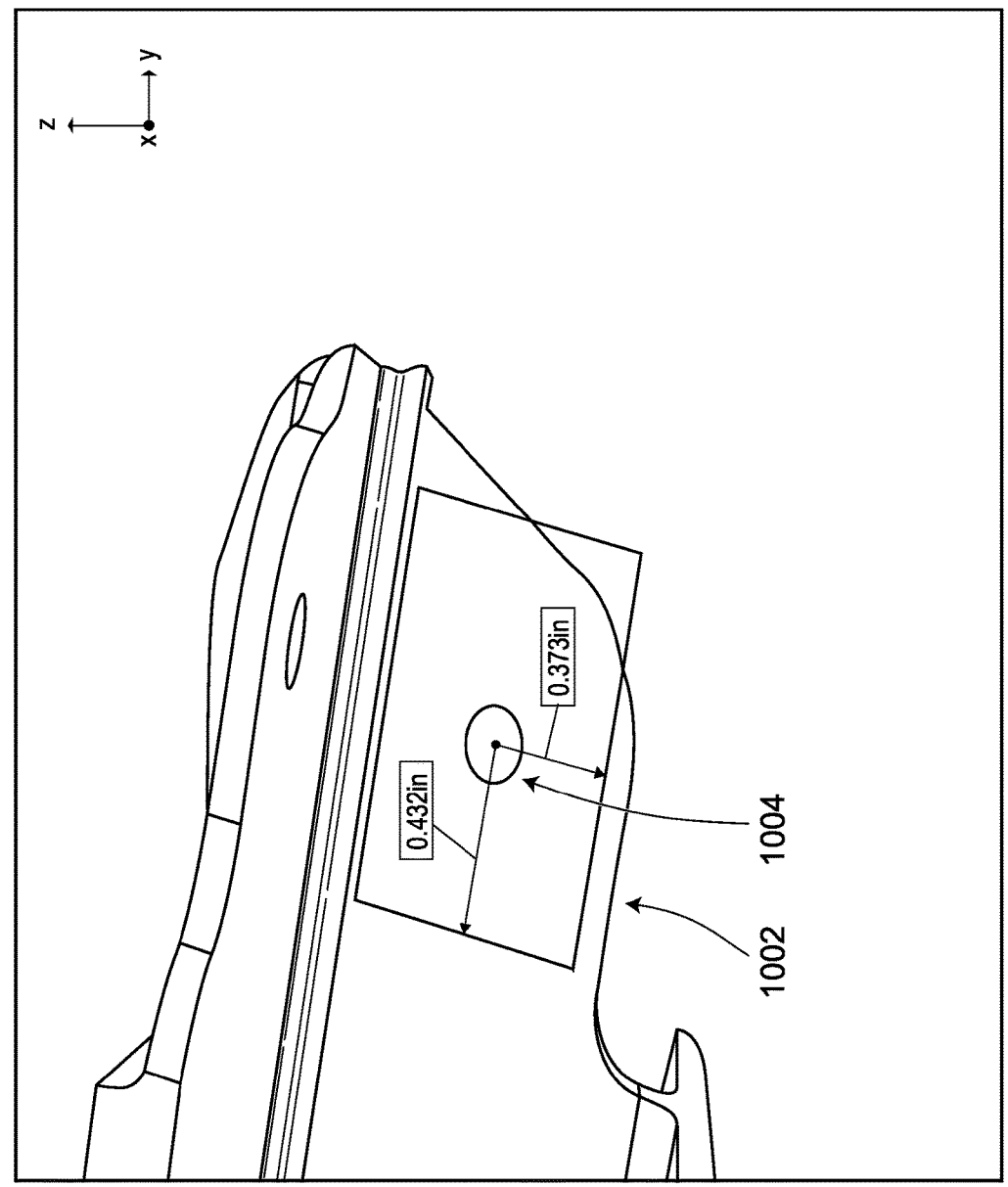
FIG. 10 shows an embodiment of a drawing of a stencil on an aerospace part in accordance with this disclosure.

FIG. 10 shows an embodiment of a drawing of a stencil that is planar-shaped in accordance with this disclosure. In particular, a screenshot 1000 shows a drawing of a stencil 1002 having a plurality of openings 1004 for manufacturing, as described herein. Note that the stencil 1002 includes an L-shaped portion defining the openings 1004 and a T-shaped portion extending from the L-shaped portion.

Figure 11:
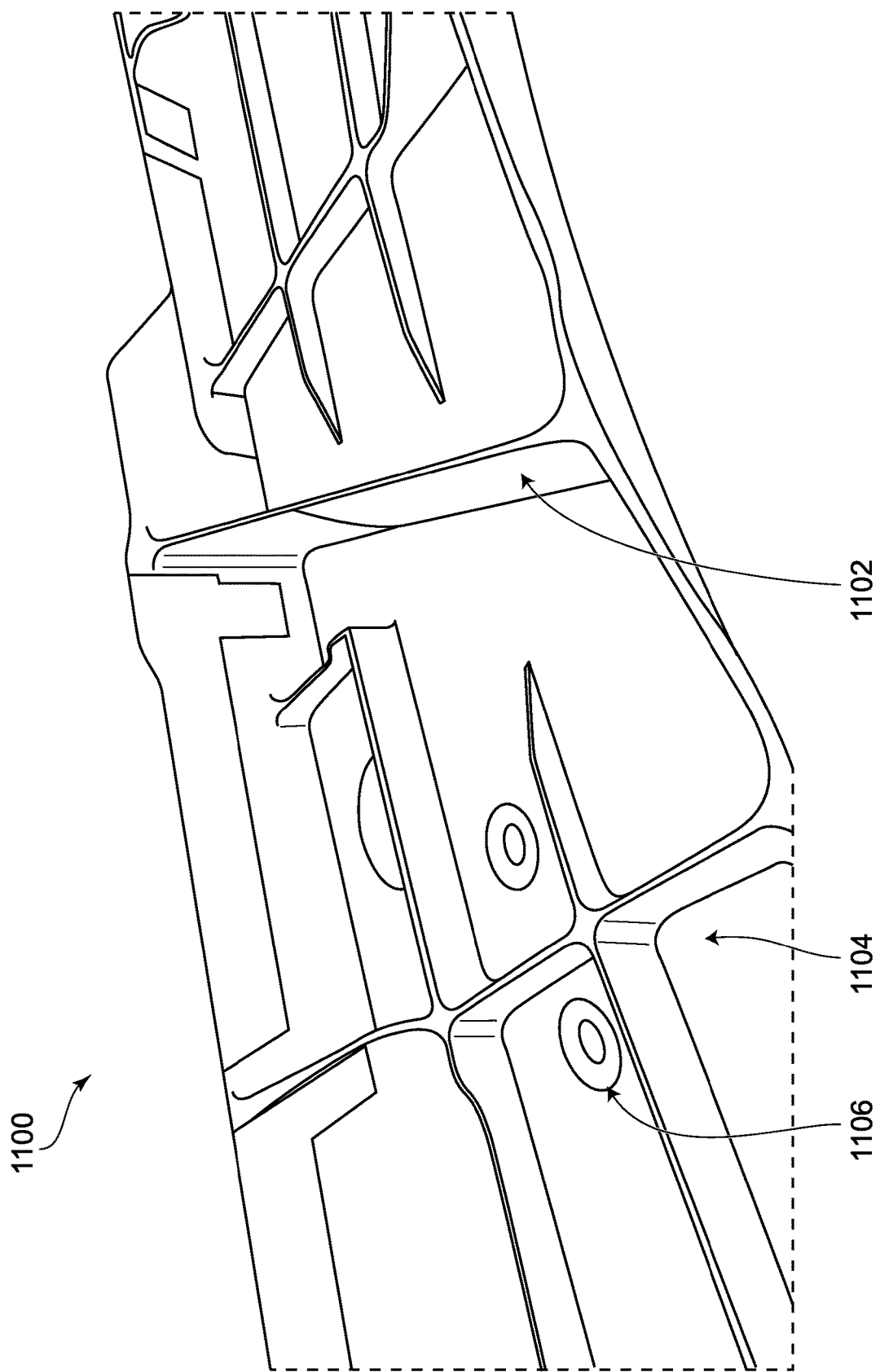
FIG. 11 shows an embodiment of a stencil on an aerospace part in accordance with this disclosure.

FIG. 11 shows an embodiment of a stencil on an aerospace part in accordance with this disclosure. In particular, an aerospace part 1100 hosts a plurality of cells 1102. At least two of the cells 1102 host a stencil 1104 defining a plurality of openings 1106 in at least two of the cells 1102. Note that the stencil 1104 contains a plurality of U-shaped portions for mounting onto at least two of the cells 1102.

Figure 12:
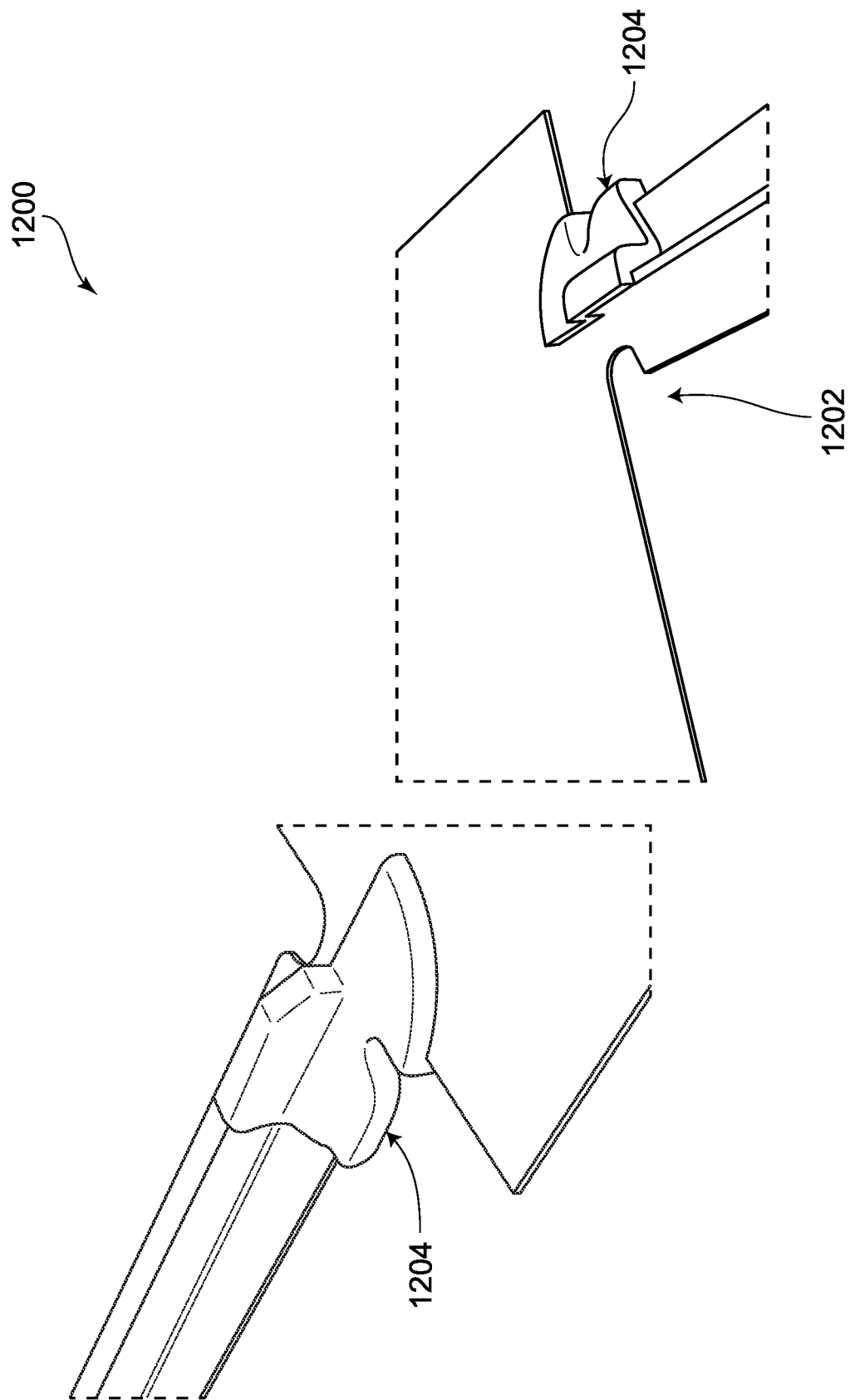
FIG. 12 shows an embodiment of a masking medium within an internal channel in accordance with this disclosure.

FIG. 12 shows an embodiment of a masking medium within an internal channel in accordance with this disclosure. In particular, an aerospace part 1200 includes a planar portion and a bridge portion (e.g. stiffener) united at a joint 1202. A masking medium 1204 having an internal channel is mounted over the joint 1202 via the internal channel. The internal channel can include a C-shaped, U-shaped, V-shaped, J-shaped, S-shaped, or G-shaped portion. Note that a stencil can be structure as the masking medium 1204, such as by defining an opening or a bay on a wall thereof.

Figure 13:
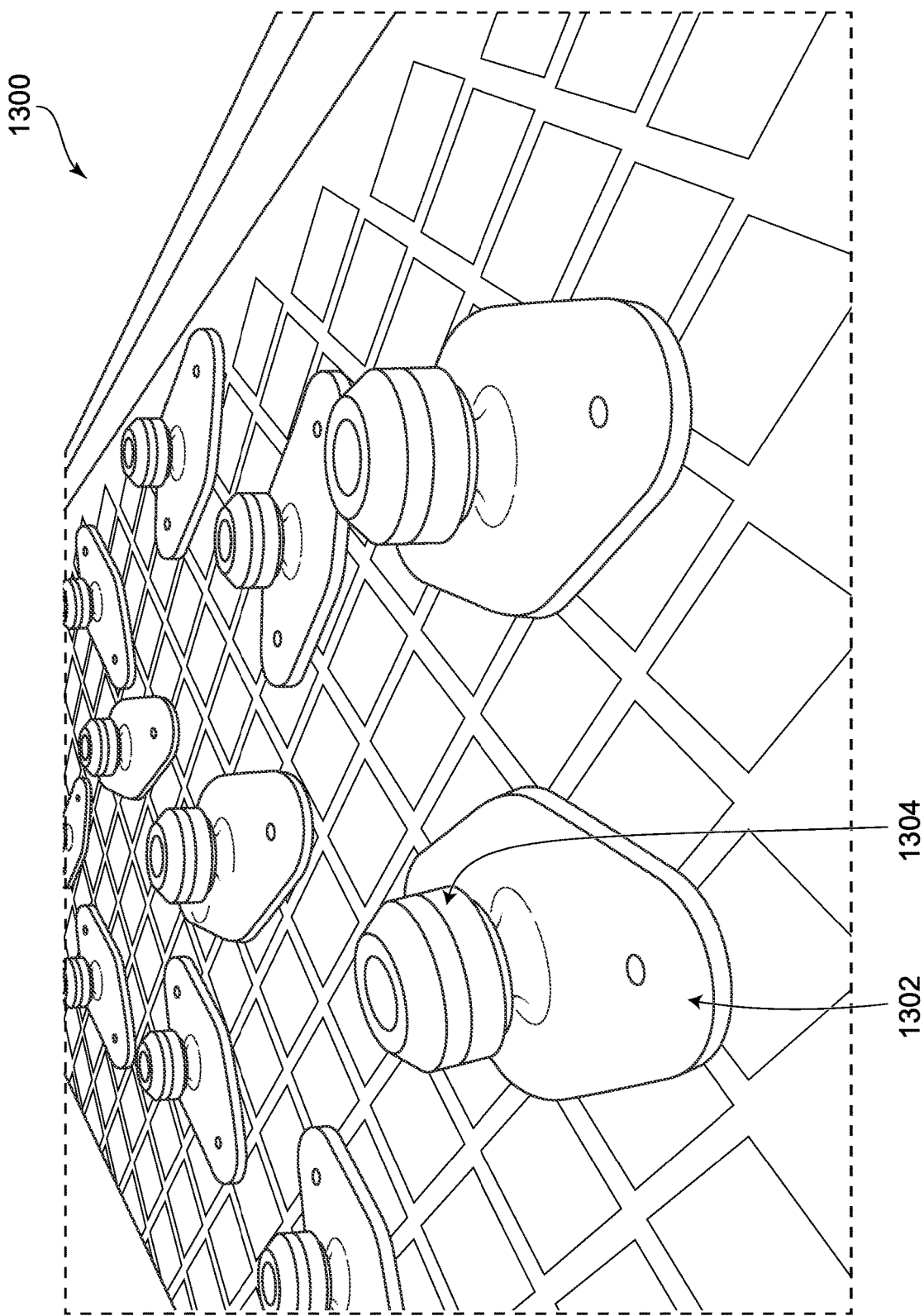
FIG. 13 shows an embodiment of a masking medium that is tubular in accordance with this disclosure.

FIG. 13 shows an embodiment of a masking medium that is tubular in accordance with this disclosure. In particular, a rigid grid 1300 supports a plurality of aerospace parts 1302, each having a tubular projection masked via a masking medium 1304. One of the masking mediums 1304 is structured as shown in FIG. 9. For example, that masking medium 1304 can be threaded onto a tubular projection, as described herein. Note that since that masking medium 1304 is reusable this can reduce material costs relative to masking tape, as shown used in other aerospace parts 1302.

Figure 14:
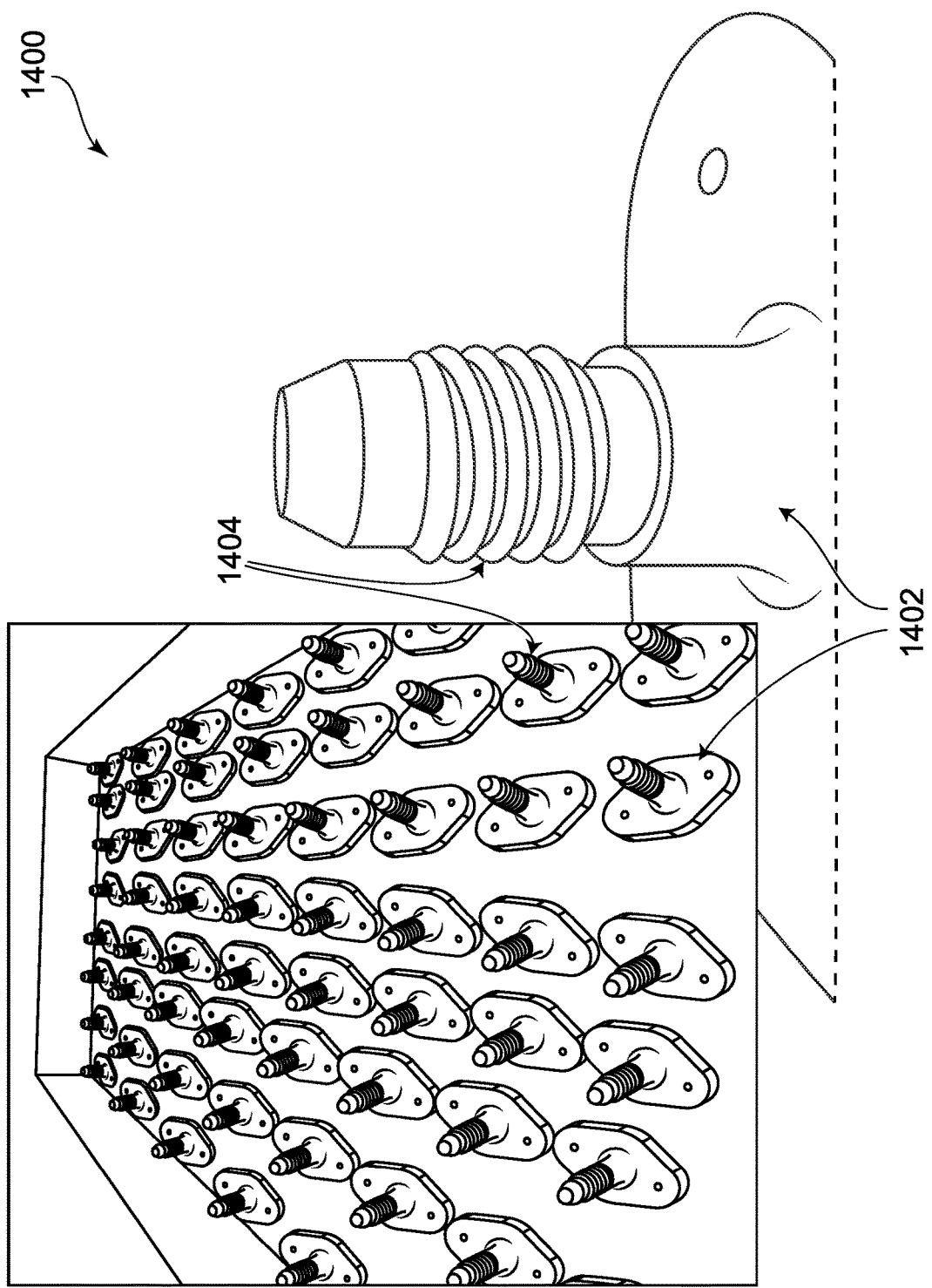
FIG. 14 shows an embodiment of an aerospace part after removal of a masking medium in accordance with this disclosure.

FIG. 14 shows an embodiment of an aerospace part after removal of a masking medium in accordance with this disclosure. In particular, a rigid platform 1400 supports a plurality of aerospace parts 1402, each having a tubular projection 1404 that is externally threaded. The aerospace parts 1402 have been masked with a plurality of masking mediums, whether identical or different to each other, before treatment and then treated. For example, the aerospace parts 1402 have been masked, as shown in FIGS. 9 and 13. For example, the aerospace parts 1402 have been treated with a layer of paint. When the masking mediums are removed, as shown in FIG. 14, the tubular projections 1404 remain untreated due to masking, whereas remaining portions of the aerospace parts 1404 have been treated. As such, the tubular projections 1404 differ in color from remaining portions of the aerospace parts 1402.

Figure 15:
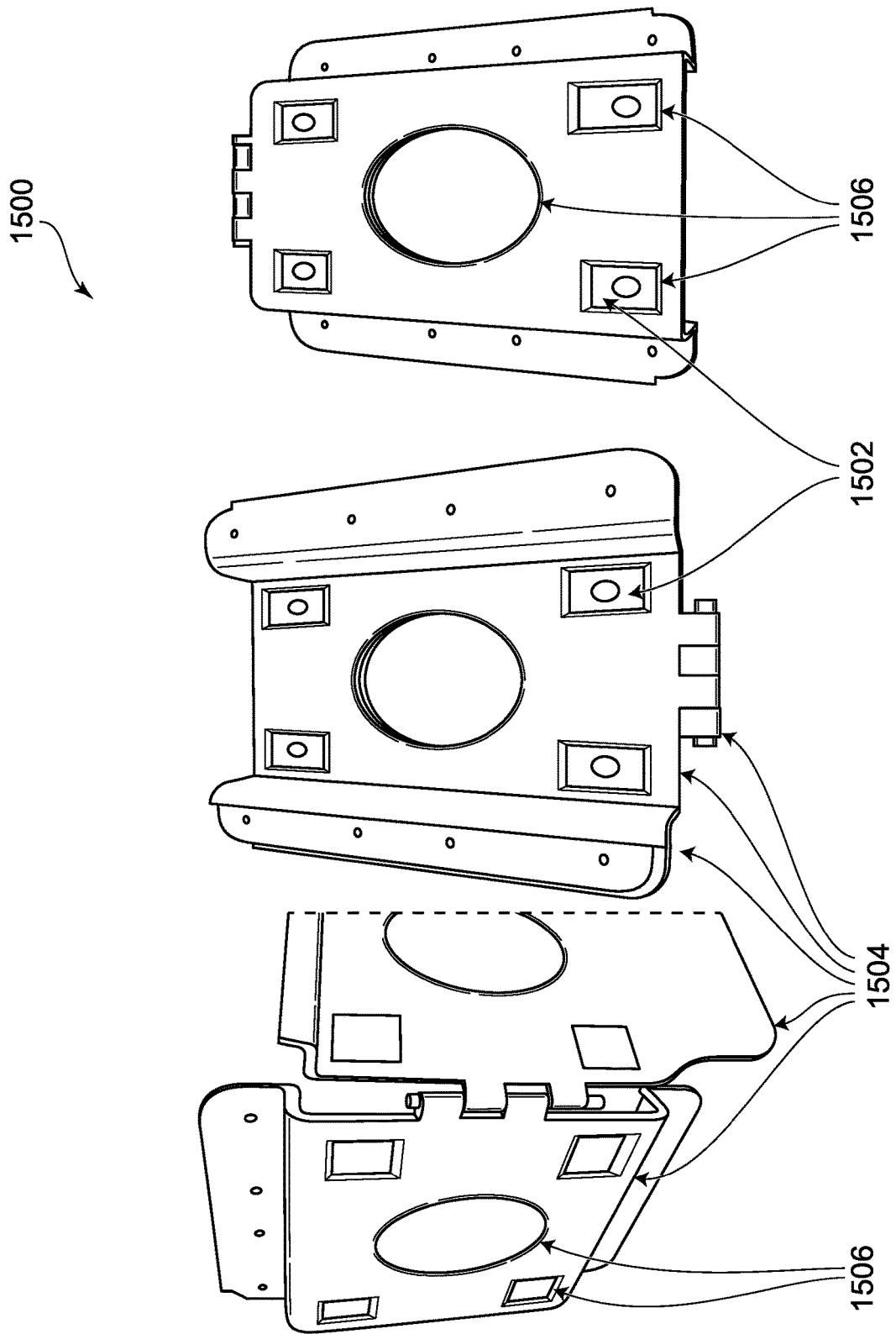
FIG. 15 shows an embodiment of a stencil that is hinged in accordance with this disclosure.

FIG. 15 shows an embodiment of a stencil that is hinged in accordance with this disclosure. In particular, a technique 1500 can be used for applying a masking medium to an aerospace part 1502 based on a stencil 1504 having a plurality of openings 1506. The stencil 1504 includes a first portion (e.g. first wing, first plate) and a second portion (e.g. second wing, second plate), where the first portion is hingedly coupled to the second portion. For example, such coupling can be with a pin or without a pin. For example, such coupling can be via fastening, mating, or others. As such, the first portion is hingedly coupled to the second portion such that the aerospace part 1502 fits between the first portion and the second portion when the stencil 1504 is closed, which can include locking, or when the first portion faces the second portion. For example, the aerospace part 1502 can be sandwiched or interposed between the first portion and the second portion. Note that the stencil 1504 can be configured to span multiple cells of some aerospace parts, as described herein. For example, the stencil 1504 can be structured to span multiple cells, such as an open book but configured to fit into multiple cells, such as via a pair of L-shaped, F-shaped, Z-shaped, N-shaped, C-shaped, U-shaped, or J-shaped portions hinged to each other.

Figure 16:
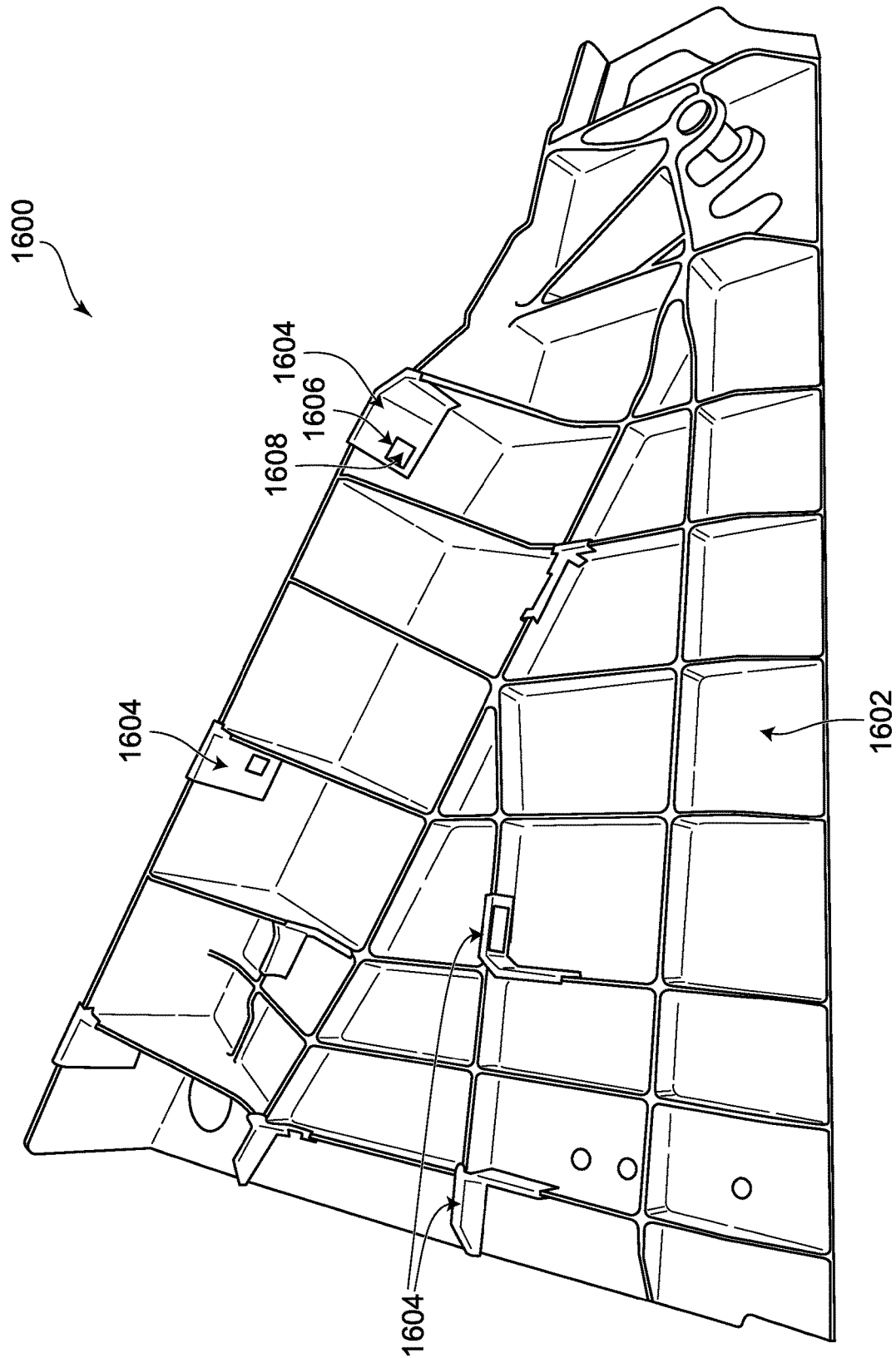
FIG. 16 shows an embodiment of an aerospace part that hosts a plurality of stencils and a plurality of masking mediums in accordance with this disclosure.

FIG. 16 shows an embodiment of an aerospace part that hosts a plurality of stencils and a plurality of masking mediums in accordance with this disclosure. In particular, an aerospace part 1600 hosts a plurality of cells 1602. Some of the cells 1602 host a plurality of stencils 1604, each having an opening 1606. Some of the openings 1606 enclose a plurality of masking mediums 1608 (e.g. identical mediums, non-identical mediums). Note that some of the masking mediums 1608 are manifested via an adhesive sticker, a rubber plug, or others.

Figure 17:
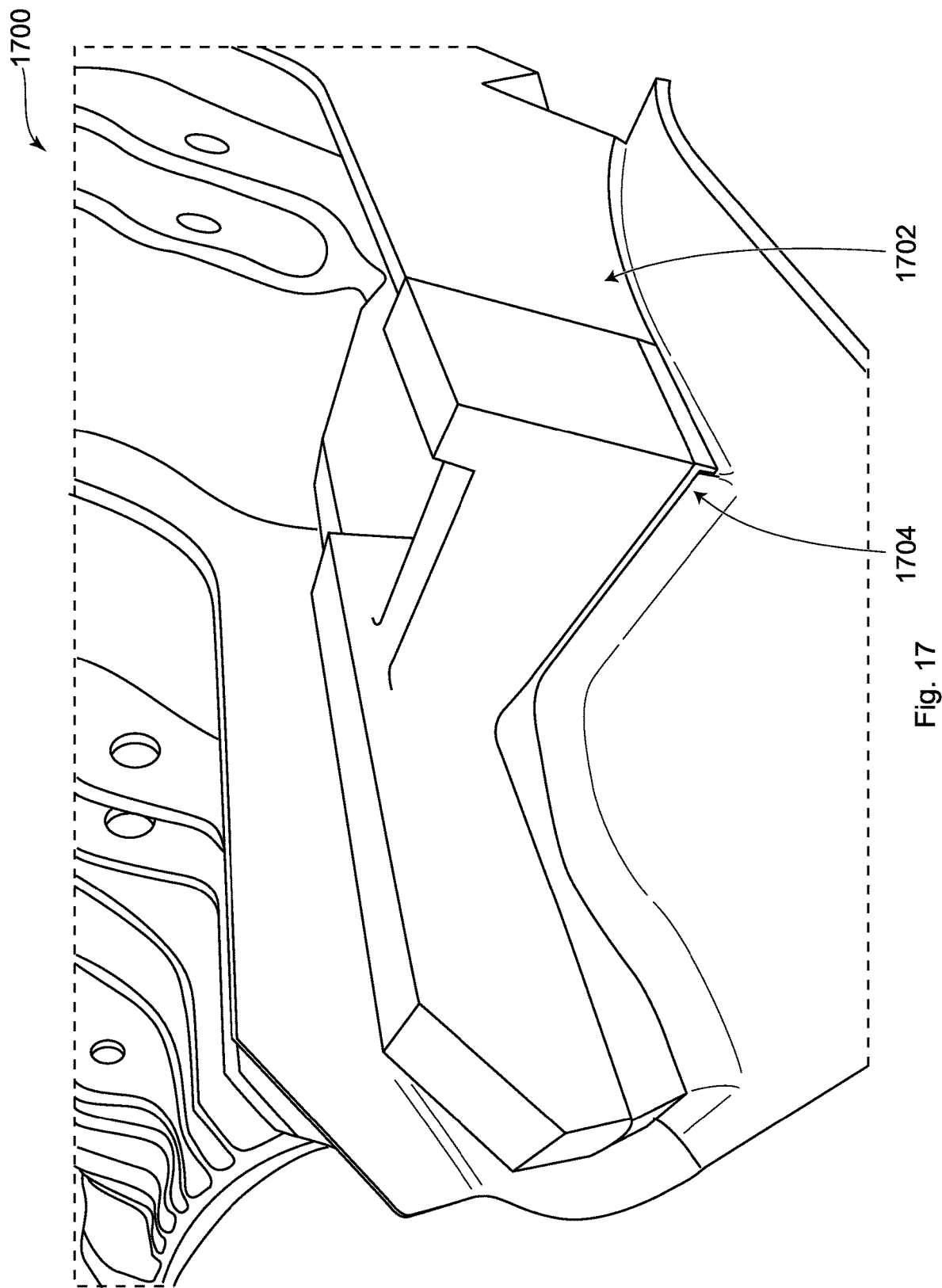
FIG. 17 shows an embodiment of a masking medium that is h-shaped in accordance with this disclosure.

FIG. 17 shows an embodiment of a masking medium that is h-shaped in accordance with this disclosure. In particular, an aerospace part 1700 hosts a cell 1702 on which a masking medium 1704 is mounted. The masking medium 1704 is h-shaped. Note that the masking medium 1704 can be magnetically or frictionally mounted, suction cupped, interlocked, mated, or others. For example, the masking medium 1704 can include a U-shaped channel for mounting onto the cell 1702. Note that a stencil can be structure as the masking medium 1704, such as by defining an opening or a bay on a wall or top thereof.

Figure 18:
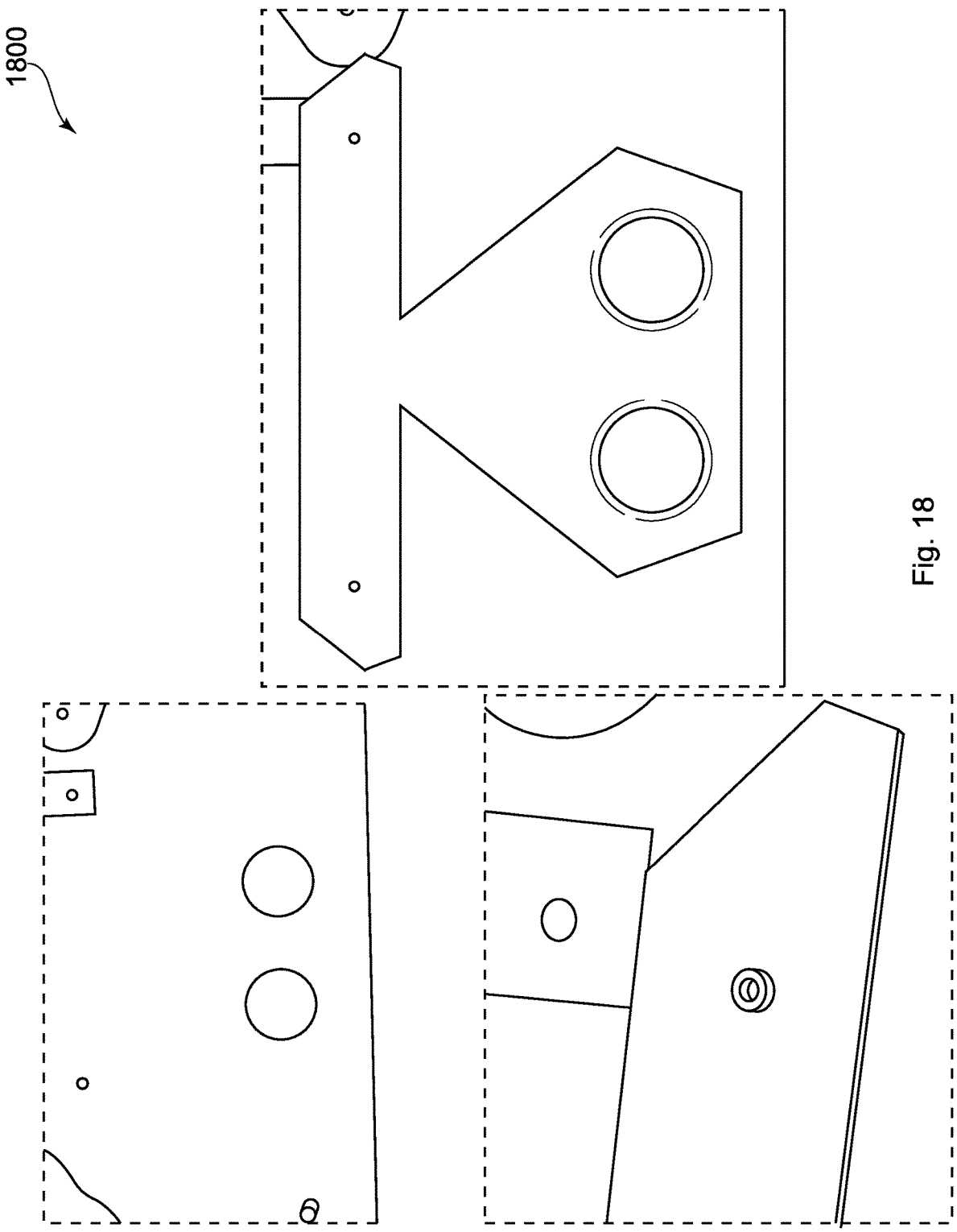
FIG. 18 shows an embodiment of a stencil positioned on an aerospace part in accordance with this disclosure.

FIG. 18 shows an embodiment of a stencil positioned on an aerospace part in accordance with this disclosure. In particular, a stencil 1800 is positioned on an aerospace part in accordance with various features of the aerospace part. The stencil 1800 has a plurality of openings which enclose a plurality of adhesive mediums coupled to the aerospace part.

Figure 19:
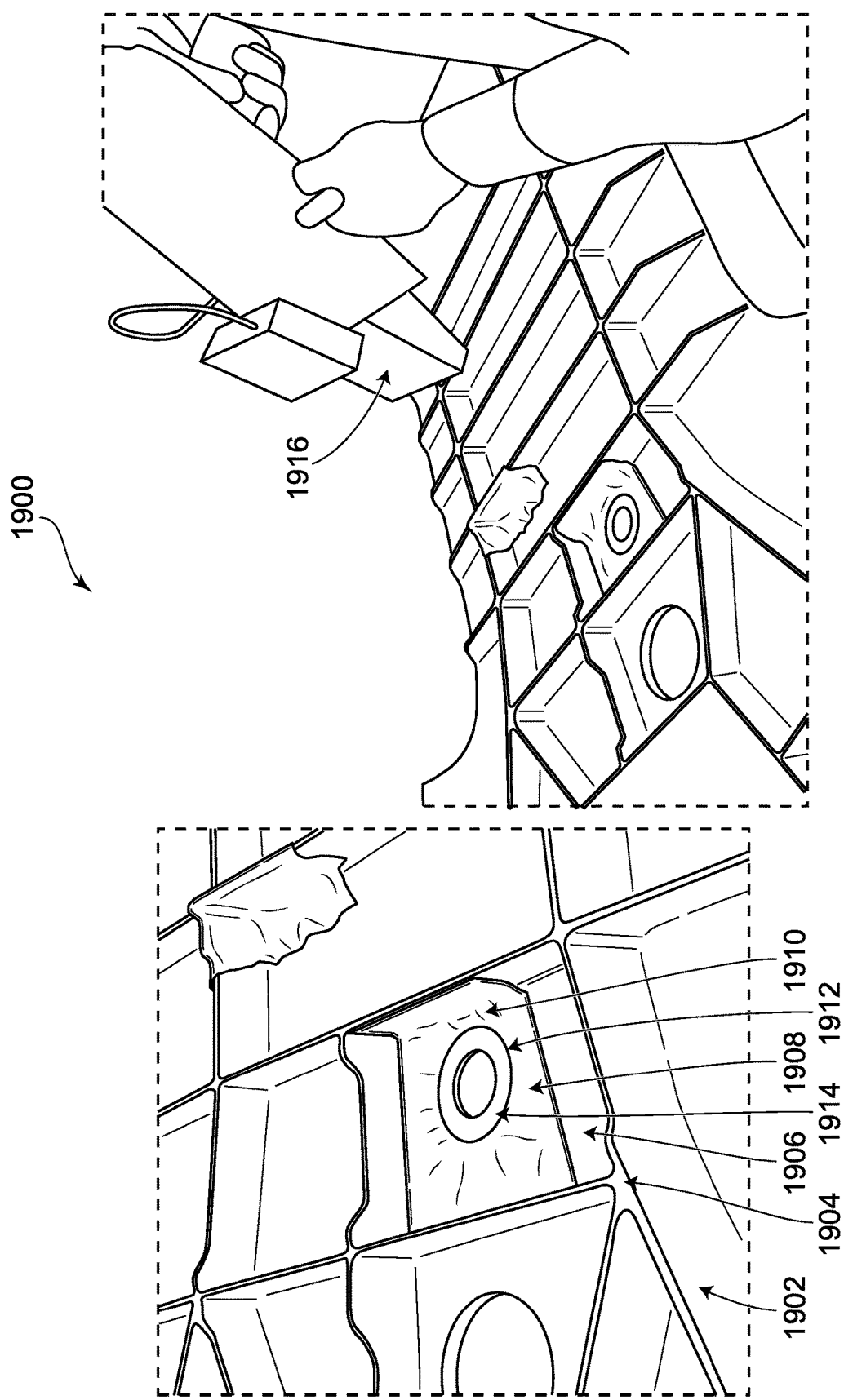
FIG. 19 shows an embodiment of a stencil being used with a laser ablation device in accordance with this disclosure.
Figure 20:
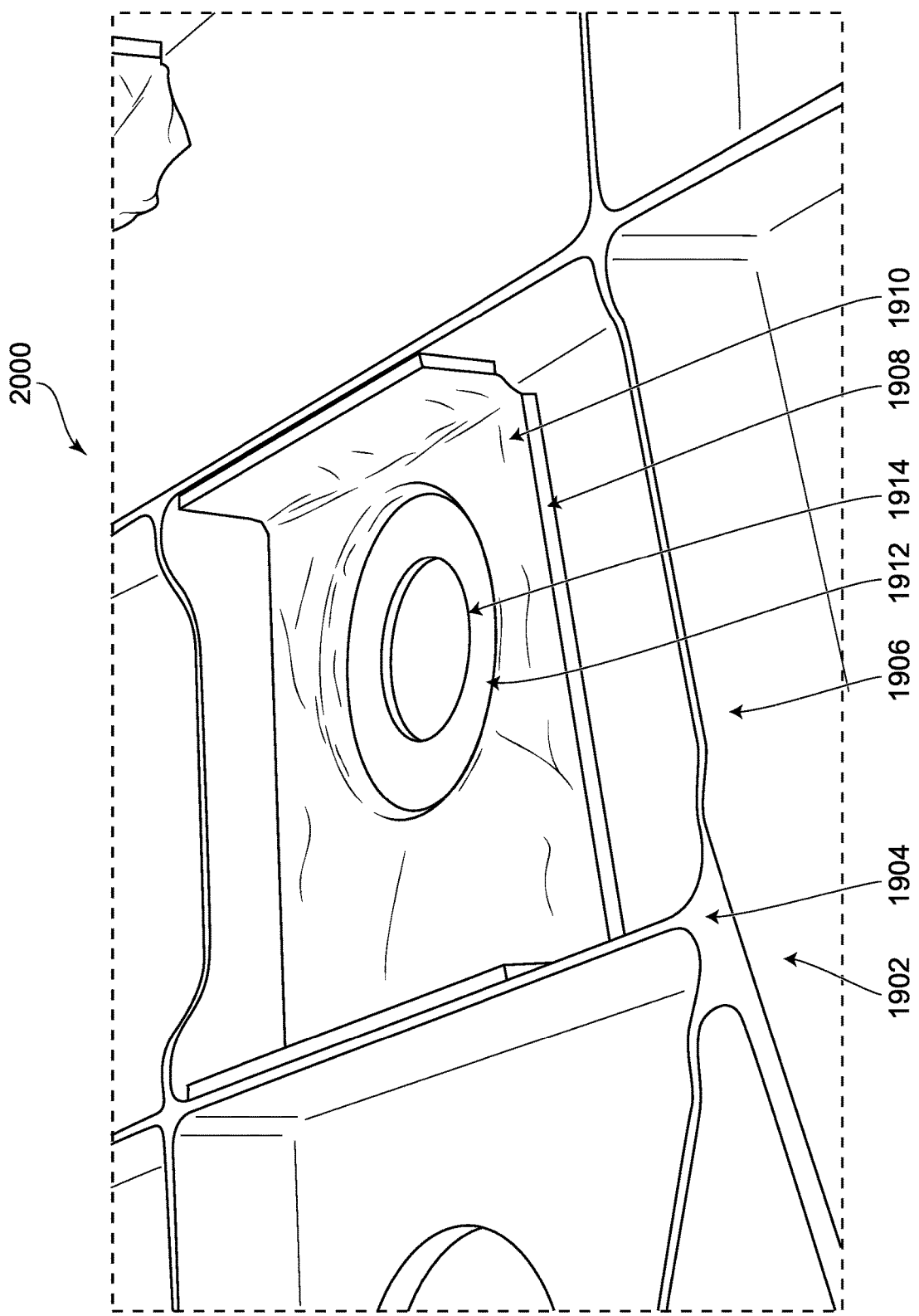
FIG. 20 shows an embodiment of a stencil with a reflective surface in accordance with this disclosure.

FIG. 19 shows an embodiment of a stencil being used with a laser ablation device in accordance with this disclosure. FIG. 20 shows an embodiment of a stencil with a reflective surface in accordance with this disclosure. In particular, a technique 1900 involves an aerospace part 1902, a stencil 1908, and a laser ablation device 1916. The aerospace part 1902 includes a grid 1904 that defines a plurality of cells 1906. Note that the laser ablation device 1916 is an example and other surface removal or surface modification devices (e.g. abrasive blaster, media blaster, drill, sander, etcher, stamper) can be used, whether additionally or alternatively.

At least one of the cells 1906 hosts a stencil 1908 that is U-shaped. However, note that the stencil 1908 can be shaped differently, whether symmetrically or asymmetrically, whether solid or perforated, such as a tray, a hinged assembly, a circle, a square, a pentagon, an octagon, a cone, a pyramid, a sphere, a cube, a cuboid, a J-shape, a C-shape, an h-shape, a Z-shape, an N-shape, a V-shape, a D-shape, an O-shape, a Y-shape, an I-shape, an S-shape, or others.

The stencil 1908 hosts a light reflective surface 1910 (e.g. metallic foil, mirror, coating, paint, gel, powder). The stencil 1908 can be unitary with the reflective surface 1910 (e.g. monolithic) or the reflective surface 1910 can be coupled to the stencil 1908 (e.g. adhering, magnetizing, suction cupping, fastening, mating, interlocking, hook-and-looping, wrapping). The stencil 1908 defines an opening 1912 about which the light reflective surface 1910 is disposed. The opening 1912 is O-shaped, but can be shaped differently. For example, the opening 1912 can be closed-shaped, such as an O-shape, D-shape, Q-shape, or others. The opening 1912 can be open-shaped, such as U-shape, C-shape, V-shape, or others. The opening 1912 can be symmetrical or asymmetrical. The opening 1912 can be polygonal, corner-less, oval, circular, ovoid, elliptical, square, rectangular, triangular, pentagonal, octagonal, hexagonal, trapezoidal, tapering, star-shaped, crescent shape, cross-shaped, or others.

When the stencil 1908 rests within at least one of the cells 1906, the opening 1912 exposes a surface area 1914 of that respective cell 1906. As such, when the laser ablation device 1916 is positioned over the aerospace part 1902, the surface area 1914 can be treated with illumination (e.g. laser) from the laser ablation device 1916, while the light reflective surface 1910 masks and reflects the illumination from the laser ablation device 1916, thereby protecting what is underneath the light reflective surface 1910 from the illumination of the laser ablation device 1916.

For example, a coating (e.g. paint) can be applied to the aerospace part 1902. Using various features of the aerospace part 1902 (e.g. the grid 1904), the stencil 1908 is positioned on the aerospace part 1902. The stencil 1902 includes the opening 1912, which exposes the surface area 1914 that is desired to be free of the coating. When the laser ablation device 1916 is positioned over the aerospace part 1902, the light reflective surface 1910 can reflect the illumination from the laser ablation device 1916 such the ablation device 1916 can only ablate the surface area 1914 and thereby remove the coating on the surface area 1914 through the opening 1912 in the stencil 1908.

For example, a coating (e.g. paint) positioned within the surface area 1914 may need to be removed due to certain defects. As such, a media blaster (e.g. abrasive blaster, sandblaster, plastic blaster, wet abrasive blaster, bead blaster, wheel blaster, hydro blaster, micro abrasive blaster, automated blaster, dry-ice blaster, bristle blaster, vacuum blaster) can be used to remove the coating from the surface area 1914 by forcibly outputting a blasting medium onto the surface area 1914. Therefore, the stencil 1908, whether with or without the light reflective surface 1910, can be placed on the aerospace part 1902 using specific part features (e.g. the grid 1904) such that the surface area 1914 is exposed to the media blaster to enable removal of the coating. However, the stencil 1908 protects what is underneath the stencil 1908 (e.g. various surfaces of the aerospace part 1902) from the blasting medium being applied at the area 1914. As such, the stencil 1908 allows only the surface coating to be removed from desired locations of the aerospace part 1902.

Figure 21:
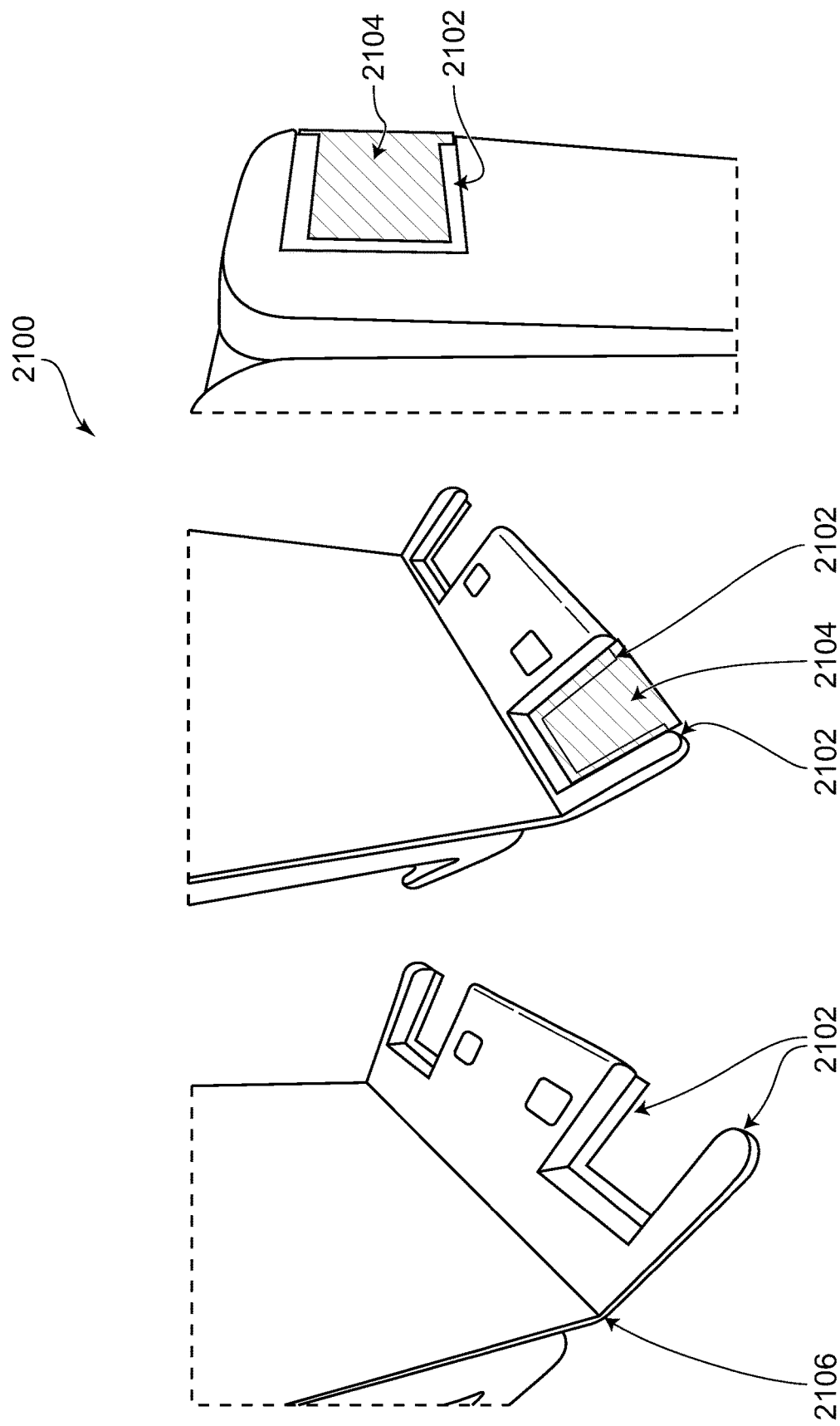
FIG. 21 shows an embodiment of a stencil configured to apply a masking medium in accordance with this disclosure.

FIG. 21 shows an embodiment of a stencil configured to apply a masking medium in accordance with this disclosure. In particular, a stencil 2100 is used to locate a masking surface on an aerospace part. The stencil 2100 includes a body 2106 and a pair of arms 2102. The pair of arms 2102 extend from the body 2106, which be cantileveredly. The pair of arms 2102 extend parallel to each other, but can extend non-parallel to each other. The pair of arms are rectilinear, but can extend in other ways, such as sinusoidal, arcuate, or others.

The pair of arms 2102 have a pair of ledges or ridges that oppose each other. The pair of ledges or ridges are structured to hold or support (e.g. friction, adhesive, hook-and-loop, gravity) a masking medium 2104 thereon simultaneously. As such, the masking medium 2104 can be applied to the pair of arms 2102 such that the pair of arms 2102 hold or the support the masking medium 2104 simultaneously. For example, the masking medium 2104 can span or bridge between the pair of arms 2102.

The stencil 2108, while holding or supporting the masking medium 2104, is positioned onto the aerospace part in order to visually identify the masking surface on the aerospace part. For example, the stencil 2108 can be positioned onto the aerospace part using specific part features of the aerospace part (e.g. grid). For example, the masking medium 2104 can face the aerospace part 2108 at this time. Consequently, the masking medium 2104 can be applied onto the masking surface using a force (e.g. manual, automatic) applied to the masking medium 2104. For example, the force can include a physical pressure applied from above the masking medium 2104 onto the masking medium 2104. For example, the force can be applied between the pair of arms 2102. For example, upon application of the force, the masking medium 2104 can fall off or detach from the pair of arms 2102 or still remain at least partially on or attached to the pair of arms 2102. Subsequently, the masking medium 2104 contacts, rests, or couples (e.g. adhere, magnetize, suction cup, hook-and-loop, interlock, mate, fasten) to the masking surface. Therefore, the stencil 2108 can be removed (e.g. lifting, raising) from the aerospace part, while leaving the masking medium 2104 positioned on the aerospace part. For example, when the stencil 2108 is removed from the aerospace part, the masking medium 2104 falls off or detaches from the pair of arms 2102.

Figure 22:
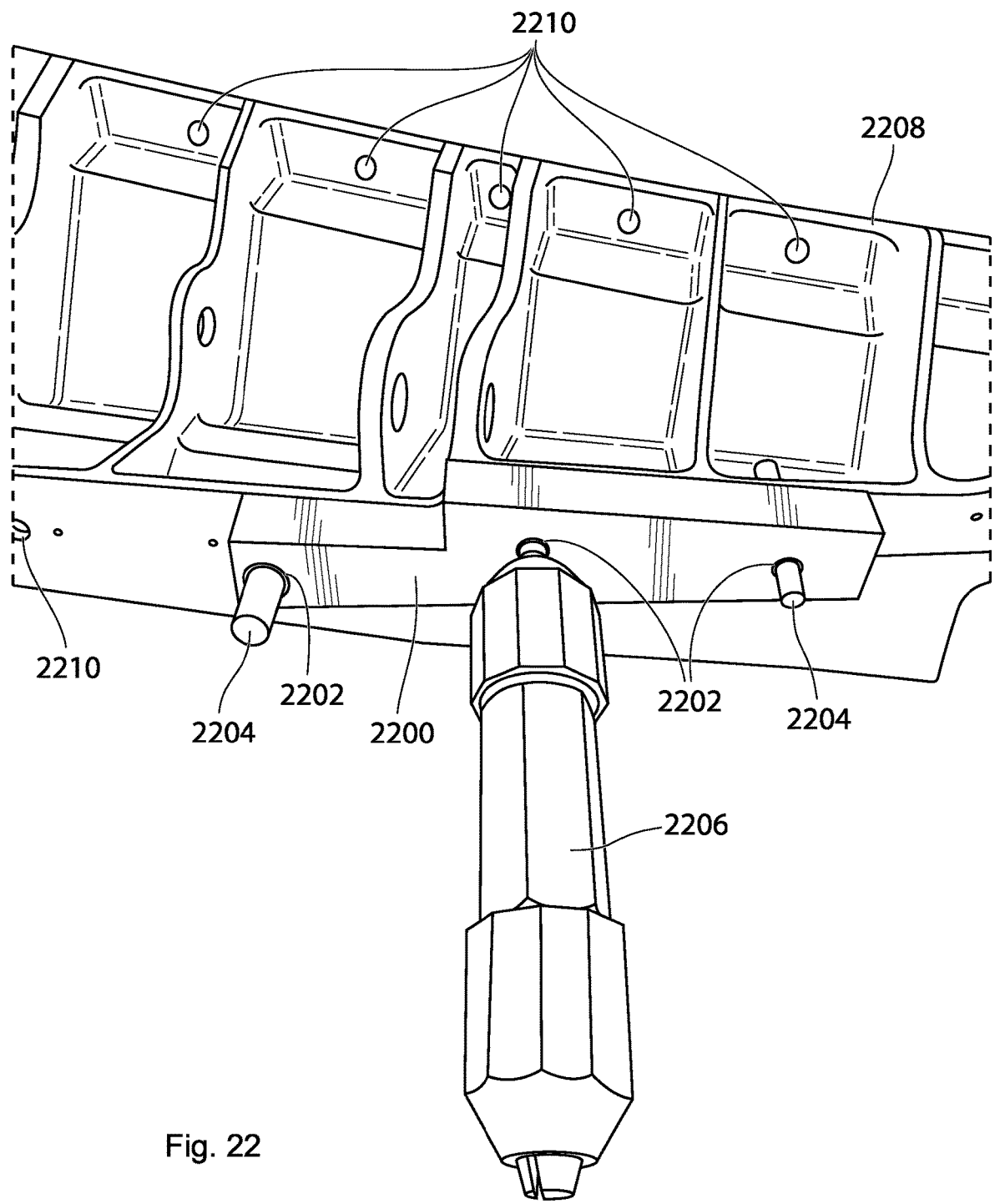
FIG. 22 shows an embodiment of a stencil being used as a drill jig in accordance with this disclosure.

FIG. 22 shows an embodiment of a stencil being used as a drill jig in accordance with this disclosure. In particular, a stencil 2200 can be structured, shaped, sized, oriented, constituted, propertied, used, or manufactured, as any other stencil described herein. The stencil 2200 has a plurality of openings 2202 therein. The openings 2202 are circular, but can be shaped differently (e.g. oval, rectangular, triangular). The openings 2202 are through openings, but can be wells. The openings 2202 can be distributed on the stencil 2200 in any pattern, whether or not on same plane or equidistant from each other.

The stencil 2200 is positioned against an aircraft part 2208. The aircraft part 2208 can be structured, shaped, sized, oriented, constituted, propertied, used, or manufactured, as any other aircraft part described herein. The aircraft part 2208 has a plurality of openings 2210. The openings 2210 are circular, but can be shaped differently (e.g. oval, rectangular, triangular). The openings 2210 are through openings, but can be wells.

The stencil 2200 is removably secured to the aircraft part 2208 via a plurality of pins 2204 extending through the openings 2202 and the openings 2210. The pins 2204 can include metal, plastic, rubber, glass, silicon, carbon, epoxy, resin, thermoplastic, or others. For example, metal can include steel, stainless steel, titanium, aluminum, iron, tungsten, chrome, vanadium, copper, brass, bronze, zinc, tin, niobium, molybdenum, hafnium, chromium, carbide, boride, nickel, gold, silver, tantalum, platinum, zirconium, an alloy of any of foregoing, a composite of any of foregoing, or others. The pins 2204 are longitudinally rectilinear, but can be extending non-rectilinearly (e.g. arcuate, sinusoidal, zigzag, helical).

A drill 2206 (or another machine for redefinition) drills into at least one of the openings 2202 between the pins 2204 through the aerospace part 2208. The at least one of the openings 2202 provides a visual guide as to where the drill 2206 should be inserted. Therefore, in terms of knowing where to redefine the aerospace part 2208, when the stencil 2200 is positioned onto or over the aerospace part 2208 or vice versa, the stencil 2200 can visibly guide this redefinition of the aerospace part 2208.

Although this disclosure has been described relative to aerospace parts, note that this disclosure can be applied to non-aerospace parts, such as land vehicle parts, marine vehicle parts, medical device parts, food grade device parts, circuit or chip design parts, industrial machinery parts, construction machinery parts, consumer device parts, firearm parts, toy parts, clothing or garment parts, plumbing parts, construction parts, electrical parts, or others. For example, this disclosure can be applied to shipbuilding, which includes any marine vehicle or any components thereof, just like other non-aerospace parts.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, then there are no intervening elements present.

Various terminology used herein is for describing particular example embodiments and is not intended to be necessarily limiting of this disclosure. As used herein, various singular forms "a," "an" and "the" are intended to include various plural forms as well, unless specific context clearly indicates otherwise. Various terms "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" or "substantially" refers to a +/−10% variation from a nominal value/term. Such variation is always included in any given value/term provided herein, whether or not such variation is specifically referred thereto.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain example embodiments can be combined and sub-combined in and/or with various other example embodiments. Also, different aspects and/or elements of example embodiments, as disclosed herein, can be combined and sub-combined in a similar manner as well. Further, some example embodiments, whether individually and/or collectively, can be components of a larger system, wherein other procedures can take precedence over and/or otherwise modify their application. Additionally, a number of steps can be required before, after, and/or concurrently with example embodiments, as disclosed herein. Note that any and/or all methods and/or processes, at least as disclosed herein, can be at least partially performed via at least one entity in any manner.

Example embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various example embodiments of this disclosure should not be construed as necessarily limited to various particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Various corresponding structures, materials, acts, and equivalents of all means or step plus function elements in various claims below are intended to include any structure, material, or act for performing the function in combination with other claimed elements as specifically claimed. Various embodiments were chosen and described in order to best explain various principles of this disclosure and various practical applications thereof, and to enable others of ordinary skill in a pertinent art to understand this disclosure for various embodiments with various modifications as are suited to a particular use contemplated.

This detailed description has been presented for various purposes of illustration and description, but is not intended to be fully exhaustive and/or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

The invention claimed is:

1. A method, comprising:
creating a drawing of a stencil having an opening;
manufacturing the stencil based on the drawing such that the stencil defines the opening therethrough, wherein the stencil is manufactured via 3D printing;
positioning the stencil onto an aerospace part, such that the aerospace part is accessible through the opening, wherein the stencil is custom to the aerospace part;
positioning a masking medium onto the aerospace part through the opening;
removing the stencil from the aerospace part, such that the masking medium remains on the aerospace part; and
treating the aerospace part with the masking medium thereon.

2. The method of claim 1, wherein the stencil is shaped as a tray.

3. The method of claim 1, wherein the stencil includes a wall extending about the opening.

4. The method of claim 1, wherein the aerospace part includes a cell having a wall, wherein the stencil includes a portion having a U structure for mounting onto the wall.

5. The method of claim 1, wherein the stencil is shaped as a corner.

6. The method of claim 5, wherein the stencil includes a plurality of walls, wherein at least one of the walls defines the opening.

7. The method of claim 5, wherein the stencil includes a floor defining the opening.

8. The method of claim 1, wherein the stencil is tubular.

9. The method of claim 8, wherein the stencil is threaded.

10. The method of claim 8, wherein the stencil includes a pair of portions that engage with each other.

11. The method of claim 10, wherein the pair of portions mate with each other.

12. The method of claim 1, wherein the stencil includes a first portion and a second portion, wherein the first portion is hingedly coupled to the second portion.

13. The method of claim 12, wherein the first portion is hingedly coupled to the second portion, such that the aerospace part fits between the first portion and the second portion as the first portion faces the second portion.

14. The method of claim 1, wherein the masking medium is positioned onto the aerospace part through the opening based on a computational detection of the opening.

15. The method of claim 14, wherein the computational detection involves at least one of a camera, a microphone, an ultrasonic sensor, a laser, a light detection and ranging, a radar, a proximity sensor, an spectrometer, an infrared sensor, a distance sensor, or a heat sensor.

16. The method of claim 1, wherein creating the drawing, manufacturing the stencil, positioning the stencil, positioning the masking medium, removing the stencil, and treating the aerospace part occurs within a defined area.

17. A method, comprising:
creating a drawing of a stencil having an opening;
manufacturing the stencil based on the drawing, such that the stencil defines the opening therethrough, wherein the stencil is manufactured via 3D printing;
positioning the stencil onto a part, such that the part is accessible through the opening, wherein the stencil is custom to the part;
positioning a masking medium onto the part through the opening;
removing the stencil from the part, such that the masking medium remains on the part; and
treating the part with the masking medium thereon.

18. The method of claim 17, wherein the part is an aerospace part positioned within a building.

19. The method of claim 17, wherein the stencil is shaped as a tray.

20. The method of claim 17, wherein the stencil includes a wall extending about the opening.

21. The method of claim 17, wherein the part includes a cell having a wall, wherein the stencil includes a portion having a U structure for mounting onto the wall.

22. The method of claim 17, wherein the stencil is shaped as a corner.

23. The method of claim 17, wherein the stencil is tubular.

24. The method of claim 17, wherein the stencil includes a first portion and a second portion, wherein the first portion is hingedly coupled to the second portion.

25. The method of claim 17, wherein creating the drawing, manufacturing the stencil, positioning the stencil, positioning the masking medium, removing the stencil, and treating the part occurs within a defined area.

* * * * *